United States Patent
Leser et al.

(10) Patent No.: US 7,587,749 B2
(45) Date of Patent: Sep. 8, 2009

(54) COMPUTER METHOD AND APPARATUS FOR MANAGING DATA OBJECTS IN A DISTRIBUTED CONTEXT

(75) Inventors: Norbert Leser, Camden, ME (US); Fajen Kyne, Winchester, MA (US); Robert Morgan, North Andover, MA (US); Christopher B. Barclay, Newton, MA (US); Edward J. Gaudet, Hanover, MA (US); James Schoonmaker, Arlington, MA (US); Arnold S. Epstein, Sudbury, MA (US); Michael D. Smith, Lexington, MA (US)

(73) Assignee: Liquid Machines, Inc., Lexington, MA (US)

(*) Notice: Subject to any disclaimer, the term of this patent is extended or adjusted under 35 U.S.C. 154(b) by 756 days.

(21) Appl. No.: 10/856,112

(22) Filed: May 28, 2004

(65) Prior Publication Data

US 2005/0028006 A1    Feb. 3, 2005

Related U.S. Application Data

(60) Provisional application No. 60/475,109, filed on Jun. 2, 2003.

(51) Int. Cl.
*G06F 17/00* (2006.01)
*H04L 9/00* (2006.01)
*G06F 21/00* (2006.01)
*G06F 15/173* (2006.01)

(52) U.S. Cl. ............................ 726/1; 705/57; 705/59; 709/229

(58) Field of Classification Search .................. 705/57, 705/59; 709/229; 726/1
See application file for complete search history.

(56) References Cited

U.S. PATENT DOCUMENTS 5,335,346 A    8/1994    Fabbio (Continued)

FOREIGN PATENT DOCUMENTS

WO    WO 99/01815    1/1999

(Continued)

OTHER PUBLICATIONS

Microsoft® Computer Dictionary, Fifth Edition Excerpt: Fkeys—flash ROM http://proquest.safaribooksonline.com/0735614954/ch07 Pub Date: May 1, 2002.*

*Primary Examiner*—Kambiz Zand
*Assistant Examiner*—Benjamin A Kaplan
(74) *Attorney, Agent, or Firm*—Hamilton Brook Smith & Reynolds, PC

(57) ABSTRACT

In a network of intermittently-connected computers, a method and apparatus for maintaining and managing control over data objects authored, accessed, and altered by users in dynamic, distributed, and collaborative contexts. The invention method and apparatus attach to each data object an identification of a respective control policy. Each control policy comprises at least an indication of a subset of the users who may access the data object, an indication of the privileges granted to each subset of users able to access the data object, and an indication of a subset of users who may define or edit the control policy. The invention method and apparatus separate the management of the control policies of data objects from the creation and use of the data objects. The invention method and apparatus automate common policy changes, distribution of policy changes to the enforcement agents, and propagation of control policies to derivative works.

44 Claims, 17 Drawing Sheets

U.S. PATENT DOCUMENTS

| | | | |
|---|---|---|---|
| 5,432,851 A | 7/1995 | Scheidt et al. | |
| 5,513,260 A | 4/1996 | Ryan | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,729,734 A | 3/1998 | Parker et al. | |
| 5,748,736 A | 5/1998 | Mittra | |
| 5,892,900 A | 4/1999 | Ginter et al. | |
| 5,910,987 A | 6/1999 | Ginter et al. | |
| 5,920,861 A | 7/1999 | Hall et al. | |
| 6,006,332 A * | 12/1999 | Rabne et al. | 726/6 |
| 6,115,819 A | 9/2000 | Anderson | |
| 6,138,119 A | 10/2000 | Hall et al. | |
| 6,157,721 A | 12/2000 | Shear et al. | |
| 6,185,683 B1 | 2/2001 | Ginter et al. | |
| 6,188,766 B1 | 2/2001 | Kocher | |
| 6,249,866 B1 | 6/2001 | Brundrett et al. | |
| 6,278,783 B1 | 8/2001 | Kocher et al. | |
| 6,289,455 B1 | 9/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,427,140 B1 | 7/2002 | Ginter et al. | |
| 6,449,721 B1 | 9/2002 | Pensak et al. | |
| 6,571,254 B1 | 5/2003 | Kido et al. | |
| 6,931,531 B1 | 8/2005 | Takahashi | |
| 7,082,536 B2 | 7/2006 | Filipi-Martin et al. | |
| 7,130,829 B2 * | 10/2006 | Banerjee et al. | 705/51 |
| 7,239,709 B1 | 7/2007 | Yamada et al. | |
| 2001/0026618 A1 | 10/2001 | Van Wie et al. | |
| 2001/0042043 A1 | 11/2001 | Shear et al. | |
| 2002/0023214 A1 | 2/2002 | Shear et al. | |
| 2002/0032873 A1 | 3/2002 | Lordemann et al. | |
| 2002/0048369 A1 | 4/2002 | Ginter et al. | |
| 2002/0071553 A1 | 6/2002 | Shirai et al. | |
| 2002/0099947 A1 | 7/2002 | Evans | |
| 2002/0112171 A1 | 8/2002 | Ginter et al. | |
| 2002/0136410 A1 | 9/2002 | Hanna | |
| 2002/0141582 A1 | 10/2002 | Kocher et al. | |
| 2002/0147906 A1 | 10/2002 | Lotspiech et al. | |
| 2002/0150245 A1 | 10/2002 | Sugimoto et al. | |
| 2002/0178271 A1 * | 11/2002 | Graham et al. | 709/229 |
| 2002/0178377 A1 | 11/2002 | Hemsath et al. | |
| 2002/0188869 A1 | 12/2002 | Patrick | |
| 2002/0191797 A1 | 12/2002 | Perlman | |
| 2003/0002673 A1 | 1/2003 | Van Wie et al. | |
| 2003/0023856 A1 | 1/2003 | Horne et al. | |
| 2003/0041239 A1 | 2/2003 | Shear et al. | |
| 2003/0046244 A1 | 3/2003 | Shear et al. | |
| 2003/0051172 A1 | 3/2003 | Lordemann et al. | |
| 2003/0070072 A1 | 4/2003 | Nassiri | |
| 2003/0110397 A1 * | 6/2003 | Supramaniam et al. | 713/201 |
| 2003/0215095 A1 | 11/2003 | Nagafuji | |
| 2004/0052379 A1 | 3/2004 | Nishimoto et al. | |

FOREIGN PATENT DOCUMENTS

| | | |
|---|---|---|
| WO | WO 99/48296 | 9/1999 |
| WO | WO 01/06374 A2 | 1/2001 |
| WO | WO 01/06374 A3 | 1/2001 |

* cited by examiner

COMPUTER METHOD AND APPARATUS FOR MANAGING DATA OBJECTS IN A DISTRIBUTED CONTEXT

RELATED APPLICATIONS

This application claims the benefit of U.S. Provisional Application No. 60/475,109, filed on Jun. 2, 2003, the entire teachings of which are incorporated herein by reference.

BACKGROUND OF THE INVENTION

The present invention relates to the field of usage rights enforcement and management for digitally encoded documents and data.

The encoding and distributing of audio, video, graphical, and written work in digital formats has become a fundamental part of modern business. However, the ease with which copies may be made that are identical to the original and the speed of distribution enabled by the Internet have caused the owners of such works to adopt technologies that associate and enforce usage rights with digitally encoded data. Examples of those interested in such technologies include: providers of music, movies, or other entertainment content; publishers of electronic newspapers, magazines, or books; and corporations with confidential, proprietary, or otherwise sensitive information. Without loss of generality and for ease of exposition, we will refer to all of these kinds of digitally encoded works as data objects.

Many approaches exist to associate and enforce usage rights with data objects. One common approach is based on technologies that attempt to prevent the unauthorized copying of data objects from the physical media carrying the objects. U.S. Pat. No. 5,513,260 is an example of one such copy protection scheme.

Though copy-protection techniques are appropriate for some domains, the types of usage rights that they can enforce are too coarse grained to be a general solution. For example, the owner of a proprietary and confidential document may wish to have one group of individuals be able to only read a protected document and a different group be allowed to read and write it. Copy-prevention technologies are not powerful enough to describe such usage policies.

More general-purpose approaches exist that protect the data objects so that only authorized users can access and use the objects according to a set of rules specified for each class or group of authorized user. This approach typically relies on encryption technology to guarantee that only authorized users have access to the actual data object. In particular, authorized users are given access to the secret key needed to decrypt the protected object and produce the actual data object. The usage rights typically specify who is authorized to access the secret key and what an authorized user can do with the decrypted data object. This basic approach includes the large body of work in digital rights management (DRM) and related rights management technologies. Though this approach does not prevent copying of the encrypted bits, it achieves the same end result as copy protection since unauthorized users cannot access the protected data objects without the secret key.

To be effective, a rights management system must tightly couple the usage rights to the encrypted data objects so that the usage rights always appear with the associated object. This coupling should make it very difficult and ideally impossible for someone, who is not the owner of the object or otherwise authorized, to separate the data object from its usage rights.

We can group attacks that attempt to separate a data object from its usage rights into two categories. The first category comprises attacks on the combination of the usage rights and encrypted data object. Replacing the usage rights of one file with the usage rights of another is an example of an attack in this category. The second category comprises attacks undertaken while the data object is decrypted and being used by an authorized user. The goal here is to obtain an unprotected copy of the decrypted data object by directly circumventing the usage rights. To be effective, a rights management system must contain mechanisms that protect against both categories of attack.

The second category of attacks highlights the fact that the encrypted data object must eventually be decrypted in order to be accessed by an authorized user. A rights management system may either allow the user to decrypt the data object directly, or it may require the deployment and use of rights-management-aware applications. In many commercial situations, the owner of the protected data object may not want to bother the end user with an explicit encryption and decryption step or may not trust the end user to abide by the usage rights. Thus, the preferred method is to employ rights-management-aware applications that transparently decrypt the data objects for authorized users and enforce the usage rules attached to the objects. Rights-management-aware applications act as trusted agents for the rights management system, enforcing the rules specified by the owners of the protected data objects. Media players that can play music files in encrypted formats are examples of rights-management-aware applications.

The closeness of the coupling and the reliance on trusted application agents constitute the fundamental differences between rights management systems and technologies like encrypting file systems. In an encrypting file system (e.g., Microsoft's EFS, U.S. Pat. No. 6,249,866), usage rights are associated only with the computer structure holding the data object (e.g., a file) and not with the data object itself. Since applications are not aware of the usage rights enforced by an encrypting file system, it is fairly simple for a user, who is authorized to access the object but not to change its usage rights, to save the data object in a manner that does not propagate the rights. In particular, an authorized user of a protected file in an encrypting file system needs only to save the file to a directory outside the encrypting file system to create an unencumbered copy of the protected file.

The use of rights-management-aware applications allows a rights management system to enforce a tight coupling between an encrypted data object and its associated usage rights. Some designers have chosen to implement this tight coupling by storing the usage rights together with the encrypted data object, producing a new data object that is often referred to as a secure container (e.g., see U.S. Pat. No. 6,427,140). In this approach, usage rights are explicitly tied to a particular copy of the protected data object. This approach works well, for example, in commercial markets like online music where the owner of the data object publishes read-only content and simply wants to maintain control over the usage and distribution of the content. We refer to such rights management systems as supporting publish-only distribution models.

A key characteristic of the publish-only distribution model is that the usage rights in the secure container are not expected to change over time. Or if they do change, they change slowly, and the change affects only one end user at a time. To change the usage rights in the publish-only distribution model, the owner must have access to the secure container holding the usage rights. Access to the secure container would enable the rights management system to modify the usage rights stored in the container. If the secure container was not available, the owner can remove the end user's authorization to access the original secure container (e.g., by destroying the decryption key for this container) and re-issue a new secure container to the end user with the same protected data object but new usage rights. This latter approach requires the rights management system to notify the end user of the new secure container, and it requires that the rights management system has a copy of the data object to put into the new secure container.

Though these requirements are not an imposition in a domain like online music, they are a serious impediment to dynamic environments, i.e., ones where the usage rights protecting data objects may change frequently and in possibly significant ways. These requirements are also a serious impediment to distributed environments, where multiple users may have individual copies of a protected data object on diverse computer devices and storage media, some of which may not be online or otherwise accessible to the owner of the protected object. Clearly, it is not possible in such environments for the rights management system to have access to all of the copies of the protected object when the owner wishes to make a change to the usage rights of that protected object. It is also not desirable to re-issue a new protected data object to a group of users, since the change in usage rights may affect only a few users and should be unnoticed (transparent) to the rest. Furthermore, it may not even be possible to re-issue the protected data object in a distributed environment where the owner controls the usage rights but does not have a copy of the latest version of the object.

In a truly collaborative environment, it's often difficult and sometimes impossible to identify a single "publisher" of collaborative material. For corporate data, it is possible however to identify the "owner" of collaborative material produced for the purposes of a corporation's business. The owner is the company that employs the author or authors of the collaborative works. For collaborative environments then, there is a clear need to distinguish between those who produce sensitive material and those that determine the usage rights of the same material.

Authentica has patented a partial solution to the enforcement and management of usage rights for digital data objects in dynamic and distributed environments (U.S. Pat. No. 6,449,721). This approach allows the owner of a digital data object to maintain control over the usage rights even after the protected objects have been distributed to end users. In particular, the approach stores the usage rights of protected objects in a single, central location so that an owner of a protected data object can change the usage rights of that object without requiring simultaneous access to any of the (possibly numerous) copies of the data object. Ideally, this approach allows multiple, distributed copies of the data object to exist while maintaining only a single, authoritative copy of the object's usage rights. Having a single, authoritative copy of the object's usage rights simplifies management of the usage rights.

Authentica's approach creates a unique identifier for each segment of protected information. The Authentica key server maintains an association between unique segment identifiers, the usage rights for those segments, and the encryption keys used to protect and access each segment. To access a protected segment, an end user must authenticate to the server and provide the identifier of the protected segment he or she wishes to access. Assuming that the user is authorized to access the protected segment, the server responds with a decryption key for that segment and the usage rights for that segment and user combination. A rights-management-aware application on the end-user's machine uses the server's response to provide the end user with the owner-designated level of access to the protected segment.

Though an approach like Authentica's allows the owners of protected data objects to control usage of distributed information and dynamically change that usage information without the need to collect or redistribute the protected data objects, it is not a complete solution to the problems associated with the enforcement and management of usage rights in collaborative environments. In particular, a solution for collaborative environments needs to focus on protecting the products of collaboration in a manner that fits naturally into existing collaborative models. For example, in commercial enterprises, collaboration often produces multiple documents all protected by the same usage rights, and thus a truly collaborative solution should allow for the easy grouping of multiple documents under a single set of usage rights. In addition, it is also often expected that derivative works created during collaboration would also be protected by the usage rights of the collaboration and that changes to these rights would coincide with existing processes for moving a work into a new collaborative setting. Finally, all of the current rights management systems, especially those focused on publish-only distribution models, too tightly control the creation, modification, and distribution of protected documents to be appropriate for protecting the data objects comprising collaborative interactions. An appropriate solution should clearly distinguish between the rights held by "authors" and those held by "owners."

SUMMARY OF THE INVENTION

Various technologies and inventions in this field, including models of discretionary, mandatory, or role-based access control, and DRM (Digital Rights Management) related technologies have addressed one or another of the requirements mentioned above. The embodiments of the present invention, however, offer a unique approach that addresses all of the necessary features for a rights management system targeting dynamic, distributed, collaborative contexts.

Aspects of the invention include a method and a system for maintaining and managing control over data objects authored, accessed, and altered by users in dynamic, distributed, and collaborative contexts.

A data object is any audio, graphical, video, or written work encoded in digital form and encapsulated in a computer structure, such as a file, message, or shared memory object, that a software program can access and manipulate.

A distributed and collaborative context is one in which groups of one or more users work individually or collaboratively on collections of one or more data objects on a network of computers with at least intermittent connectivity to achieve some common purpose. In the present invention, we refer to this common purpose as a business process.

Within a business process, there can be classes of users with different sets of rights and responsibilities. In the present invention, we refer to these classes as roles.

The present invention considers a context to be dynamic if properties of the system can change during the lifetime of a business process. For example, the system might allow the set of users belonging to a role to change during a business process, or it might allow the type of control imposed on a data object to change. The invention separates the publication and modification of protected data objects from the ownership and manipulation of the policies controlling the usage of those data objects.

Control over a data object is specified by a set of rules describing how software programs run by a computer user in a particular role may access and manipulate the object. In the present invention, we refer to these rules as usage rights.

Control policies are signed assertions that describe the conditions under which usage rights are authorized. A control policy comprises at least a list of users who may access the data object, the privileges of those users with access, and an additional list of users who may define or edit the control policy. Policies in the present invention may also define supplemental properties that apply to the objects under its control, to assure authenticity, integrity, and confidentiality of those objects.

As stated in the previous paragraph, the term 'control' as used in the present invention typically implies protection against access by unauthorized users and their applications.

A further objective of the present invention is to provide a system and method for obtaining visibility into a business process. Such visibility may be achieved without committing to the risks of securing data objects by encrypting or otherwise changing the actual digital representation of their data objects. When control does not include protection, we obviously cannot ensure that we maintain control against malicious adversaries, i.e. ones that manipulate the protected data objects outside of our protected environment. However, this level of control is still desirable in business situations where an enterprise might want visibility into a business process while their data objects remain in plain text.

A further objective of the present invention is to provide a method and system for storing control policies on one or more central servers.

A further objective of the present invention is to provide a method and system for editing control policies, based on an indication of the users that may edit the control policies and the types of changes that those users can perform. Changes to a control policy would be enacted on the server storing that control policy.

A further objective of the present invention is to provide a method and system for temporarily changing one or more control policies and then reverting back automatically to the original settings at some point in the future.

A further objective of the present invention is to provide a method and system for having one or more preset temporary changes that can be enacted by the click of one button and then rolled back on the click of another button.

A further objective of the present invention is to provide a method and system for attaching to each data object an identification of one (i.e., a respective) control policy. In the present invention, we refer to the control policy whose identification is attached to a data object as the control policy protecting that data object. We also refer to such a data object as a protected data object.

A further objective of the present invention is to allow multiple data objects to reference the same control policy.

A further objective of the present invention is to provide a method and system wherein the identification of a control policy specifies the server in whose name space the actual control policy identifier is defined. In the preferred embodiment, the policy reference attached to a data object comprises a server URL and a numerical value known to that server.

A further objective of the present invention is to provide a method and system for checking by a client connected possibly intermittently to a policy server that a user attempting to create, access, or alter a data object protected by a control policy has the right to perform that action on that data object. If the user has the right, the client allows the requested action to proceed. If the user does not have the right, the client responds with an appropriate error message. In other words, the protection provided by the business process approach does not just protect proprietary, confidential, or otherwise sensitive data objects while they're stored on disk or transmitted over a communication link, but it also protects them while they are operated on by the software applications of authorized users and during inter-application communication (e.g., clipboard operations in the Microsoft Windows operating system).

A further objective of the present invention is to provide a method and system with control policies that may contain conditions that specify device, location, time-of-access, or network connectivity constraints.

A further objective of the present invention is to provide a method and system wherein users authorized to edit a control policy can change that policy without physical or electronic access to all data objects protected by the policy.

A further objective of the present invention is to provide a method and system allowing the only authoritative copy (or copies) of a protected data object to be located on computing machines or media of users without the rights to change the control policy protecting the data object.

In one embodiment of the invention, there is no notion of registering a protected data object with the policy server before distributing it to other users. This is a key aspect of the system required to support collaborative work that involves creation and modification of data objects on machines of authorized users that may be off-line.

A further objective of the present invention is to provide a method and system for allowing authorized users to create new protected data objects even when the client that they are working on has lost connectivity with the server of the specified control policy. Authorized users in this circumstance are those users that have the right to create data objects under the control policy. In the preferred embodiment, the user must have had some recent access to the policy server, where "recent" means within the cache timeout period as specified for that policy.

A further objective of the present invention is to provide a method and system for two or more authorized users to view protected data objects and work collaboratively on new and existing protected data objects even when one or more of these users' clients may have lost connectivity with the server (or servers) of the control policies protecting the collaborative data objects. The protected data objects may never have been viewed while connected to the server (or servers). The shared data objects may be new, that is, created while the users did not have connectivity with the server.

A further objective of the present invention is to provide a method and system in which the storage of the policy server scales in proportion to the number of control policies defined. The storage should not scale in proportion to the number of unique protected data objects nor with the number of copies of these protected data objects.

A further objective of the present invention is to provide a method and system for grouping control policies into business processes.

A further objective of the present invention is to provide a method and system for constructing a control policy by identifying one or more roles involved in that control policy. Each role comprises a respective set of usage rights and a list of users.

A further objective of the present invention is to provide a method and system for aggregating the usage rights of a user appearing in multiple roles contained in a single control policy.

A further objective of the present invention is to provide a method and system for differentiating between users with the privilege to administer (create, edit, and delete) business processes and their encompassing control policies from those users with the privilege to modify only the list of users in one or more roles of a control policy.

A further objective of the present invention is to provide a method and system in which the identification of a control policy on a data object can change. This change might cause the data object to be no longer managed by the system.

A further objective of the present invention is to provide a method and system allowing users with appropriate usage rights to change the control policy identifications on data objects. A user may be granted the right to unprotect data objects by changing the objects control policy identifier to "unmanaged" or equivalent status.

A further objective of the present invention is to provide a method and system with control policies that further define a list of users who may transfer data objects out of the control policy and a separate list of users who may assign the policy to data objects. Both of these actions involve changing the control policy identifier attached to a data object. There may be times when these lists contain no users.

A further objective of the present invention is to provide a method and system for automating the transfer of data objects between control policies for those users with the privilege to do the transfer and assign manually. The preferred embodiment of this aspect involves integrating a tool into the software component of an existing electronic business process.

A further objective of the present invention is to provide a method and system for allowing the administrators of business processes to determine the events that cause the automatic transfer of data objects between control policies.

A further objective of the present invention is to provide a method and system for organizing business processes in a hierarchical manner. Such a hierarchy may be used to limit the scope of transfers of data objects between control policies. It may also be used to define control policies or other properties that are common to several business processes in a single location.

A further objective of the present invention is to provide a method and system (e.g., graphical user interface) for displaying and changing the control policy of a protected data object. In one embodiment this is implemented as a drop-down window located in the title bar of the window displaying the data object. This drop-down window is referred to as the droplet control. When a user clicks on the droplet control, a window may open up with several policies and options for selection by the user.

A further objective of the present invention is to provide a method and system for displaying the list of possible control policies that a user can transfer the current data object to when the user activates the droplet control.

A further objective of the present invention is to provide a method and system for changing a data object's control policy when a user selects a new control policy in the activated droplet control window of the data object.

A further objective of the present invention is to provide a method and system for illustrating the hierarchy of control policies within business processes within an activated droplet control window.

A further objective of the present invention is to provide a method and system for encrypting data objects with a content encryption key (CEK), which is then encrypted with a key encryption key (KEK) of the control policy associated with the data object.

A further objective of the present invention is to provide a method and system for indicating whether the data objects protected by a control policy should be treated as ephemeral or permanent objects. An ephemeral data object is accessible until some designated future time; after that time, the object becomes inaccessible and unrecoverable. A permanent data object is always accessible or recoverable when presented to the rights management system or its agents.

A further objective of the present invention is to provide a method and system for forcing all data objects protected by a control policy to become inaccessible and unrecoverable before the designated future time. The business process's administrator can permanently revoke access earlier than planned.

A further objective of the present invention is to provide a method and system for recording the control policy identifier in a data structure stored with the (possibly encrypted) bits of the protected data object. In the preferred embodiment, we refer to this data structure as the Control Policy Tag (CPT).

A further objective of the present invention is to provide a method and system for attaching the CPT to the beginning or end of the protected data object.

A further objective of the present invention is to provide a method and system for constructing the CPT of a protected data object on either a client or a server machine.

A further objective of the present invention is to provide a method and system for storing the CEK safely in the CPT. The client can access protected data objects off-line with only cached policy and key (KEK) information because the CPT contains the CEK.

A further objective of the present invention is to provide a method and system for automatically replacing an expired CPT on a protected data object. Expiration of a CPT may occur because the CPT format has changed or the control policy KEK for the CPT has expired (i.e., gone beyond its validity period).

A further objective of the present invention is to provide a method and system where the trustworthy clients of the rights management system do not need code to interpret old CPT formats.

A further objective of the present invention is to provide a method and system for indicating that a control policy protects data objects that are read-only or stored on read-only computer media.

A further objective of the present invention is to provide a method and system for informing an unauthorized user of the system protecting the data object accessed. The preferred embodiment includes a text message in the CPT.

A further objective of the present invention is to provide a method and system for protecting the integrity of the CPT against tampering. The preferred embodiment uses a secure hash over the CPT fields.

A further objective of the present invention is to provide a method and system for protecting the confidentiality of a data object's CEK while stored in the CPT. The preferred embodiment encrypts the CEK with the control policy's KEK. The encrypted CEK is protected against known plaintext attacks (i.e. attacks based on the knowledge of identical pieces of two similar documents) by using random seed values and changing the CEK whenever the data object is changed.

A further objective of the present invention is to provide a method and system for protecting the server and client communication against network-based attacks. The preferred embodiment uses a Hypertext Transfer Protocol over Secure Socket Layer (HTTPS) connection for communications between the client and server.

A further objective of the present invention is to provide a method and system for enabling an audit or forensic analysis of a business process based on activities granted and denied within one or more of the control policies of that business process.

A further objective of the present invention is to provide a method and system for identifying the data objects in an activity log based on unique document identifiers maintained in the CPT.

A further objective of the present invention is to provide a method and system for allowing the client to access the server at user login time to obtain and cache the control policies in which the user is mentioned. This feature addresses issues arising in collaborative and distributed environments, including intermittent connectivity, off-line usage of protected data objects, and off-line collaboration with others mentioned in the control policy.

A further objective of the present invention is to provide a method and system for varying the polling frequency at which clients verify cached policies with the server. The frequency may be set so that the client must always verify the cache policy before permitting access.

A further objective of the present invention is to provide a method and system for having clients verify and refresh cached policies when network access is restored.

A further objective of the present invention is to provide a method and system for the server to prompt clients to refresh their cached policies.

A further objective of the present invention is to provide a method and system for specifying the expiration time of a cached control policy.

A further objective of the present invention is to provide a method and system for specifying the validity period of the KEK of a control policy.

A further objective of the present invention is to provide a method and system for allowing the server to supply a client with a limited history of KEKs for a control policy. The use of an expired policy KEK in a protected data object does not force the client to have to contact the server before accessing the object. Even though a user never accesses a protected data object while online, as long as his or her off-line access occurs within the cache timeout period of the control policy of the data object, the user will not be denied access due to an out-of-date KEK.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
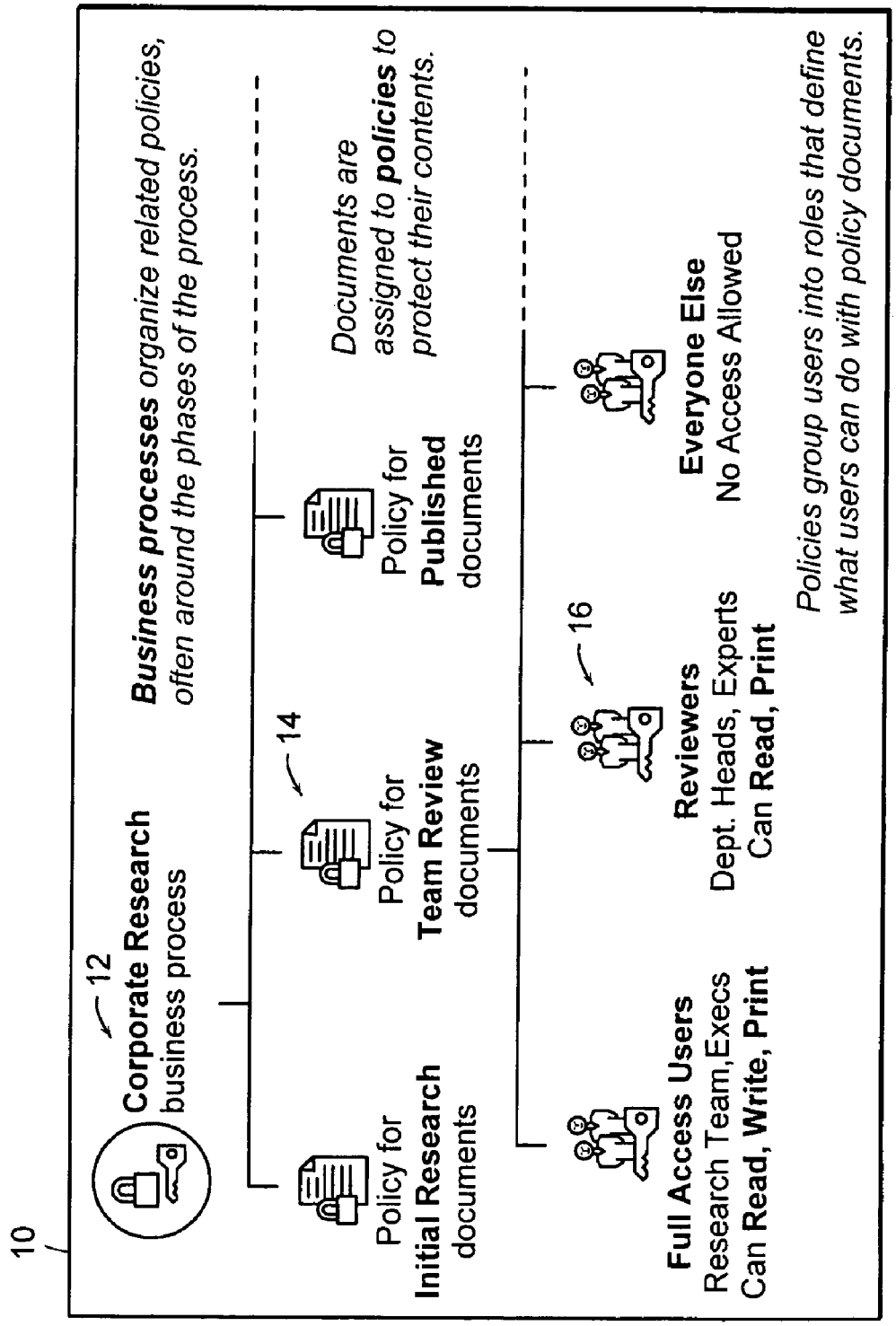
FIG. 1 is a schematic diagram of an organization structure for rights management policies.

The present invention starts with centralized management of usage rights organized in a structure that mirrors the important processes of the business. FIG. 1 illustrates the organizing structure 10 for policies employed in one embodiment of the present invention. A business process 12 represents progressively continuing procedures based on controlled phases or activities that are systematically directed at achieving specific business results. Business processes 12 within the hierarchical organizing structure 10 act as containers that hold one or more control policies 14. A control policy 14 specifies usage rules that govern how the protected data objects may be used and by whom. Policies typically represent the phases or activities within a business process and are flexible enough to support data classifications (e.g. company confidential, executive only, etc.). Each protected data object (illustrated as a document) is associated with and under the control of a single control policy 14 within a business process 12. Each control policy 14 specifies one or more roles 16. A role 16 describes the set of users (or groups) and their privileges on the data managed by a policy 14.

Using the organizing structure 10 in FIG. 1, the following embodiment of the present invention will allow an organization to retain control of usage and flow of its data objects in a manner that separates rights management actions from physical access to the copies of data objects. For example, assume that we are given a set of data objects, all of which are protected by a single control policy; note that this set may contain only a single data object. The invention and its preferred embodiments guarantee that changes to the control policy will be propagated to end users and ultimately experienced by those users when they next access the data objects protected by that changed policy. This guarantee holds even though access by the owner of the protected data objects to any or all copies of those objects may be impractical or impossible at the time of the change.

The preferred embodiments will illustrate how the present invention supports the transparent use of protected data objects in a dynamic, distributed, and collaborative environment, where multiple users are modifying individual copies of protected data objects on diverse computer devices and storage media, some of which may not be online or otherwise accessible to the owner of the protected data objects. The discussion will clearly show that the invention supports the distinction between an information author and owner. It will also illustrate that the invention includes protections against adversaries that would try to attack the association between policies and data objects.

As an example of a dynamic, distributed, collaborative environment where we need to protect data objects while simultaneously providing the ability to create, modify, and distribute these protected data objects within the constrains of a policy model, consider a company that wishes to control and protect data objects in compliance with NASD 2711, a regulation that requires a clear and auditable separation of information between the bankers and research analysts in investment banks. FIGS. 2-5 enumerate hypothetical steps in such a dynamic, distributed, and collaborative process.

Figure 2:
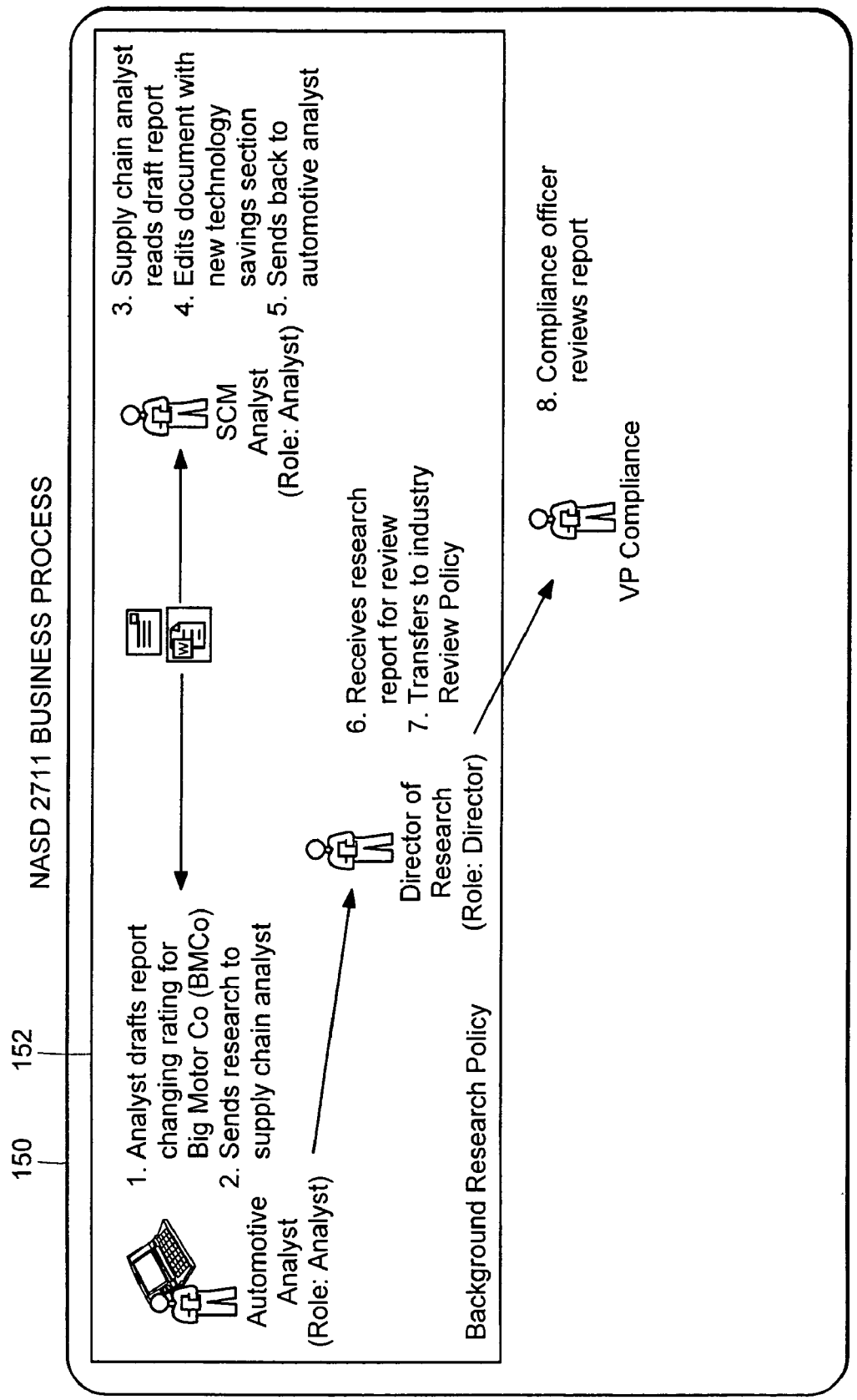
FIGS. 2-5 are illustrations of various applications of business processes and control policies.
Figure 4:
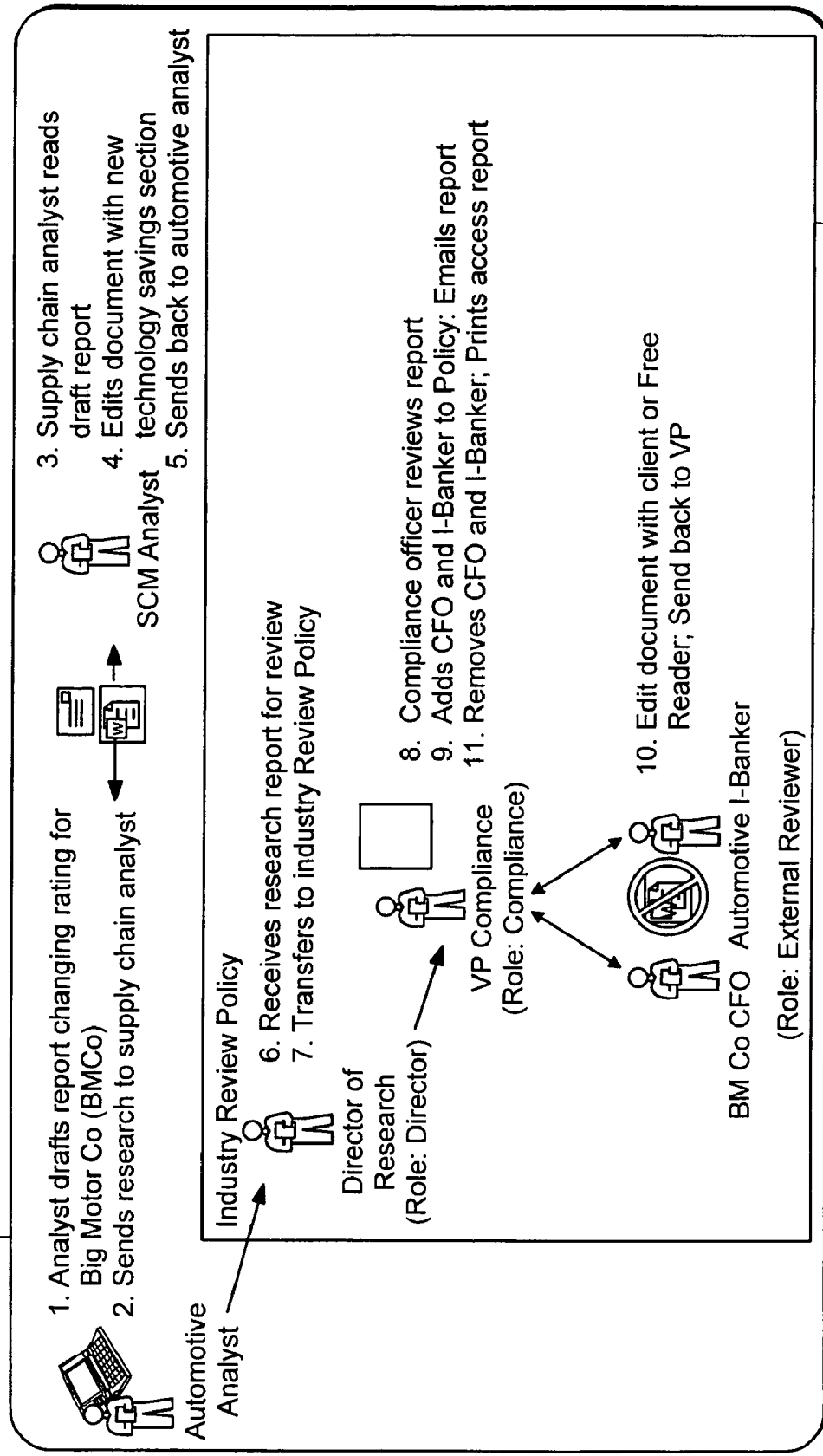
Figure 5:
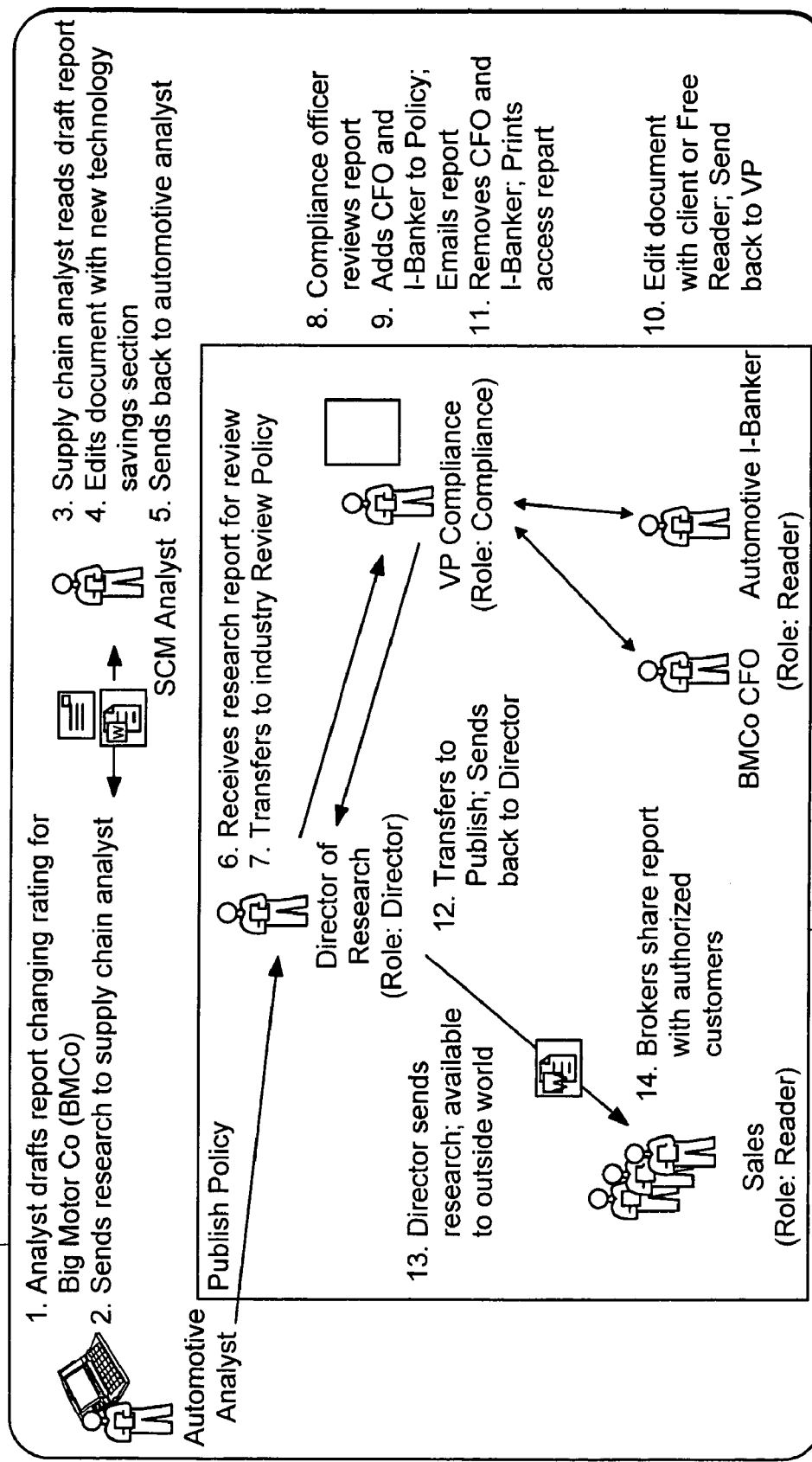

The "NASD 2711" business process 150 comprises three control policies 14: "Background Research" 152 (FIG. 2); "Industry Review" 154 (FIGS. 3 and 4); and "Publish" 156 (FIG. 5). The "VP Compliance" owns the business process and administers all aspects of it. For the "Background Research" policy 152 in FIG. 2, she creates two roles: "Analyst" and "Director". Each person listed in the "Analyst" role is able to create, read, and write reports within the "Background Research" policy. Each person listed in the "Director" role can read (but not write) the report and transfer a copy of such reports to the "Industry Review" policy 154.

The example illustrated in FIG. 2 describes the creation of an analyst report for "Big Motor Co.", which is protected and controlled by the "NASD 2711" business process 150. As the figure illustrates, analysts can draft and collaborate on reports (a data object) in this policy 152, and when they have completed a report, they can forward it to the "Director of Research", who is a member of the "Director" role, for review and ultimately transfer to compliance. Individuals not listed in one of the roles under the "Background Research" policy 152 are unable to access the reports protected by this policy.

Figure 3:
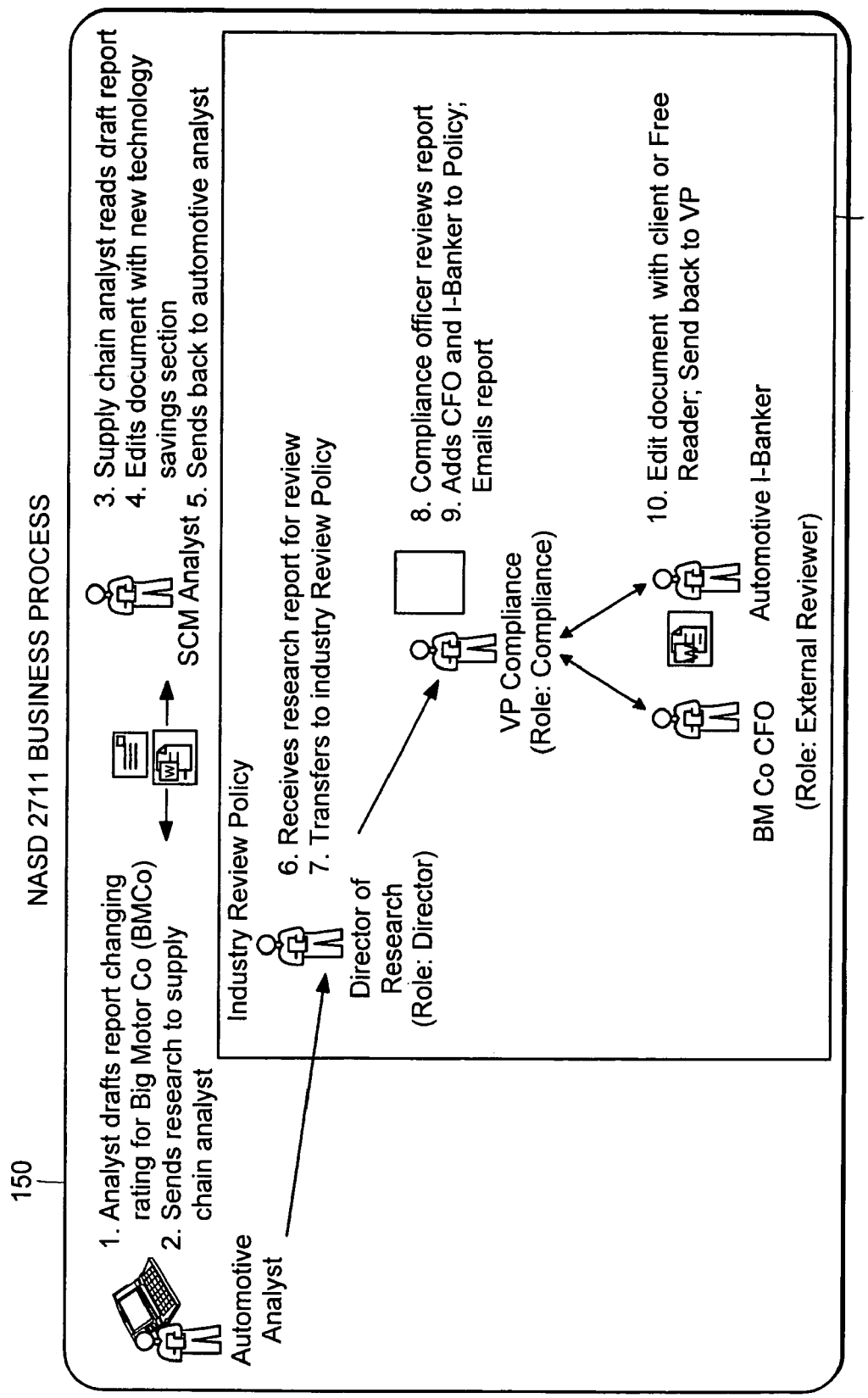

FIG. 3 describes the first part of the dynamic "Industry Review" piece 154 of this business process 150. "Industry Review" comprises a policy with three roles: the "Director" role can read protected data objects in this policy 154 and transfer data objects into the policy 154; the "Compliance" role can read the protected data objects, transfer copies of data objects to the "Publish" policy 156 (FIG. 5), and administer membership in the "External Reviewer" role; and the "External Reviewer" role can edit the protected data objects. When the "VP Compliance", who is a member of the "Compliance" role, receives a protected data object from the "Director of Research", who is a member of the "Director" role of the "Industry Review" policy 154, the "VP Compliance" edits the membership of the "External Reviewer" role to allow the "BMCo CFO" and the "Automotive I-Banker" to review and edit the protected analyst report. When the members of the "External Reviewer" role are done with their collaborative interaction, they will send the updated data object back to the "VP Compliance". The "VP Compliance" can now remove the "BMCo CFO" and the "Automotive I-Banker" from the membership of the "External Reviewer" role (and thus from the "Industry Review" policy 154) so that they are no longer able to view reports (subject data object) protected under the "Industry Review" policy, as illustrated in FIG. 4. Such removal illustrates one aspect of the dynamic nature of the present invention.

FIG. 5 completes the progression of the analyst report through the phases of a Big Motor Co. analyst review constrained by the "NASD 2711" business process 150. FIG. 5 illustrates the three roles within the "Publish" policy 156, all of which can read but not write the protected data objects. In addition, the "Compliance" role can transfer data objects into the policy 156, and the "Director" role can administer membership in the "Reader" role. When the "VP Compliance" in the "Compliance" role transfers a copy of an analyst's report to the "Publish" policy 156, the "Director of Research" in the "Director" role adds the necessary parties (e.g., the sales group and the BMCo CFO) to the "Reader" role and makes the protected analyst report available to the outside world.

Figure 6:
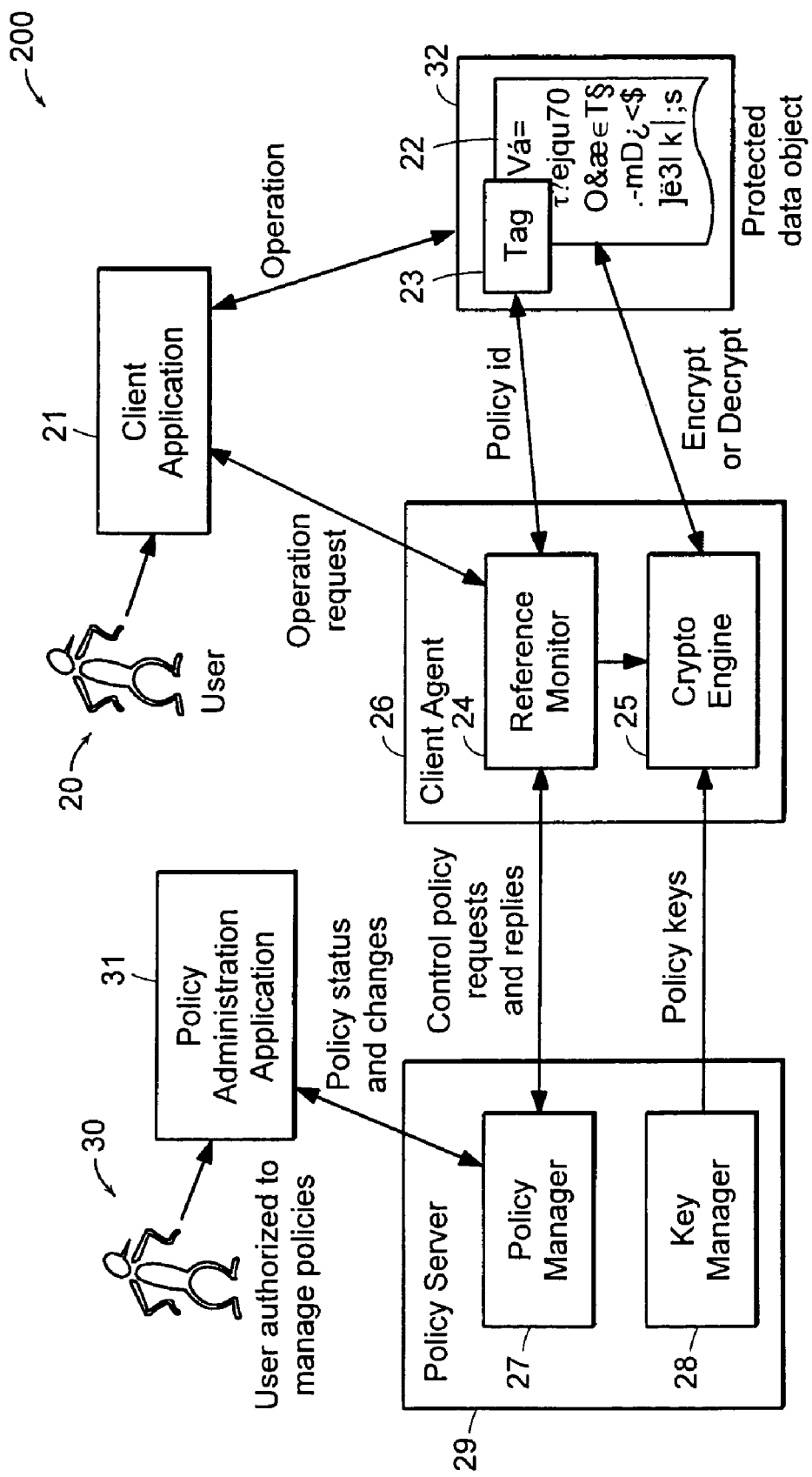
FIG. 6 is an architectural block diagram of main components of one embodiment of the invention.

The block diagram in FIG. 6 illustrates the main architectural components of an embodiment of the present invention and the primary interactions between these architectural components. A user 20 uses a rights-management-aware application 21 to operate on a protected data object 32. The protected data object 32 comprises an encrypted data object 22 and a tag 23. In some embodiments, the data object 32 may not be encrypted.

The reference monitor 24 in the client agent 26 intercepts operation requests on the data of the protected data object 32 by the rights-management-aware application 21. This monitor uses the tag 23 on the protected data object 32 to obtain the usage rights in the policy protecting this data object 22 for the user 20. The client agent 26 may have to communicate with the policy manager 27 on the policy server 29 to obtain the details of the control policy identified by the tag 23. Assuming the user 20 has the right to perform the requested operation, the crypto engine 25 in the client agent 26 will perform the appropriate encryption operation for the requested operation on the data object 22. The encryption key required to perform this operation was originally obtained from the key manager 28 on the policy server 29 as part of control policy request and reply actions.

The control policies stored on the policy server 29 may be created and edited by an appropriately authorized user 30 using a policy administration application 31, which interacts with the policy manager 27 on the policy server 29.

A particular embodiment may use multiple policy servers. Multiple servers may be used for the purpose of improved reliability or load balancing.

In a particular embodiment, the client agent 26 may have only intermittent connectivity with the policy server 29. Though the invention supports the propagation of modified usage rights to the copies of the effected data objects in a timely manner, the definition of "timely" is set by the users 30 authorized to manage policies. For example, in some commercial situations, timely might mean that all accesses to a data object after modification of its usage rights would be governed by the new rights. In other situations where the commercial environment calls for limited "off-line" access to protected data objects, timely might mean that the usage rights are updated once the local agent for the rights management system comes back online.

Rights-management-aware Applications

The client application 21 in FIG. 6 is described as a rights-management-aware application that cooperates with the client agent 26 of the rights management system to enforce the policies stored on the policy server 29. There exist numerous methods for creating such a rights-management-aware application. We might code the application 21 to interact directly with the client agent 26. Alternatively, we might code an application 21 to load and use a set of rights management libraries with standard interfaces. We would then implement a version of these rights management libraries that would manage all interactions with the client agent 26. Finally, the system on which the application 21 runs might inject the client agent 26 into applications to create rights-management-aware applications, as described in U.S. patent application Ser. No. 10/194,655, filed on Jul. 11, 2002 by Bala and Smith, entitled "METHOD FOR PROTECTING DIGITAL CONTENT FROM UNAUTHORIZED USE BY AUTOMATICALLY AND DYNAMICALLY INTEGRATING A CONTENT-PROTECTION AGENT" herein incorporated by reference.

In general, client-centric processing based on reference monitoring, as illustrated in FIG. 6, enables applications to become trusted agents of the rights management system and thus provide for local enforcement of the specified usage rights, even when the client machines are disconnected from the rest of the rights management system. Embodiments employing dynamic injection enable existing as well as new applications to become immediate participants in the rights management system.

Policies and Policy Administration

In the embodiment explained below, a control policy 14 comprises at least a list of the users authorized to access the data objects protected by that policy, a digest of the privileges granted to each user in the authorization list, a current Key Encryption Key (KEK), and a unique identifier (i.e., the Policy ID used in tags 23). Control policies 14 may also contain conditions on those privileges; these conditions may specify additional device, location, time-of-access, or network-connectivity constraints.

The present invention differentiates between the set of users 20 authorized to access data objects protected by a policy (mentioned above) and the set of users 30 to administer (i.e. create, edit, and delete) control policies and the encompassing business processes. Notice that a user might be a member of both sets of users 20, 30.

To better address business process needs of enterprises, the preferred embodiment supports three explicit types of administrative users: information technology (IT) administrators; business process owners; and business role administrators. IT administrators are those users that have administrative access to the policy server 29 in FIG. 6. Their task is to maintain the computing infrastructure required by the policy server; the IT administrators are not needed to perform the business-related administrative aspects of policy management. A business process owner is a user with the right to administer a specified business process. A business process owner may edit all aspects of the control policies 14 within the owned business process, but he or she cannot modify other business processes (unless the user is also the business process owner of those other business processes as well). A business role administrator is a user that may modify the user lists within the roles of a specified control policy 14. A business role administrator has a subset of the privileges granted to the business process owner of the business process in which the business role administrator is named.

To facilitate further categorization of an enterprise's business processes and directly reflect the hierarchical nature of business process management, one preferred embodiment supports the organizing of defined business processes in a hierarchical manner. For example, consider a collection of business processes that are organized as a tree. The business process at the root of the tree represents the topmost context, and the business processes at the leaves of the tree are the individual components of the business process at the root. Additional interior tree nodes may be used to represent major categories within the overall business process.

Such a hierarchy organized as a tree may be used to indicate the user or users that are able to administer all of the business processes within a subtree of the hierarchy. Similarly, the indicated users might be able to administer only the roles within that subtree.

Figure 7:
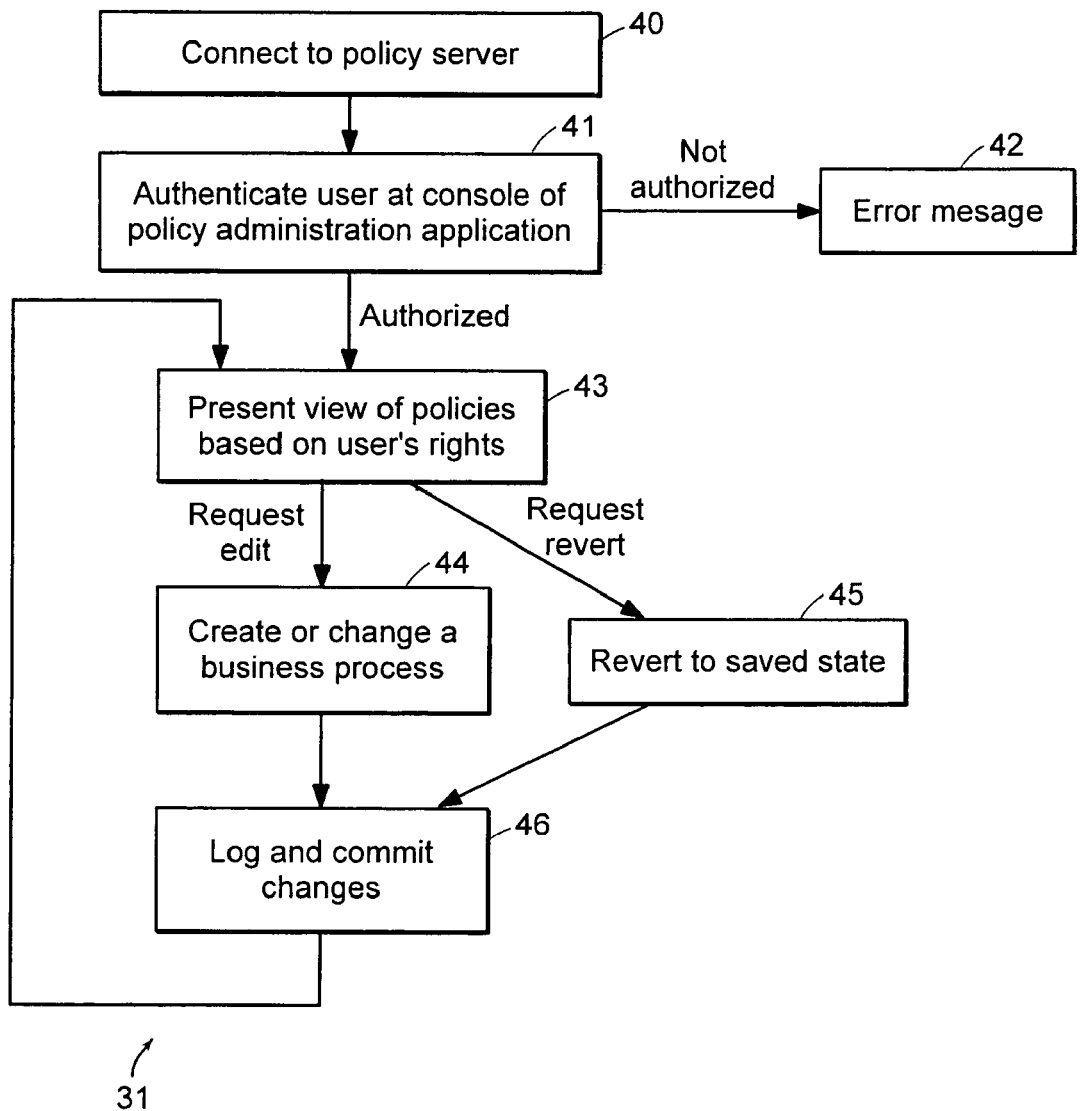
FIG. 7 is a flow diagram describing logic of policy administration.

FIG. 7 describes the logic of the policy administration application 31 in FIG. 6. The process begins in step 40 with a user starting the policy administration application 31 and connecting to a policy server 29. In one embodiment, the policy administration application 31 is a J2EE web application. At step 41, the system verifies that the user is an authorized administrator, identifies the type of administrator that the user is, and determines the types of operations that the user can perform on the policy database. If the user is not authorized to perform any actions or even view the database, an error message is displayed in Step 42. Step 43 presents a view of the business processes, their control policies, and associated roles that the authorized user can administer; the view depends upon the rights of the authorized user. Step 43 then waits for the user to select an action that modifies the database of business processes.

An authorized user may choose to create or edit a business process, control policy 14, or role list, as illustrated in step 44. All changes performed by the user are logged and committed in step 46. The changes are then displayed to the user in Step 43.

By logging the changes, the system may allow authorized users to undo an earlier change to the database on the policy server 29. In particular, Step 43 also allows the user to rollback a set of committed changes, as illustrated in step 45. This action is also logged and committed in step 46. Steps 43 through 46 are repeated until the user exits the policy administration application 31. All of these steps can occur without any access to or knowledge of the exact data objects protected by the changed business processes and policies on the policy server 29.

Security Knob

One preferred embodiment of the invention uses the rollback feature mentioned above to implement a one-click security setting that can be enabled or disabled in a dynamic manner. We colloquially call the one-click security setting the security knob.

In the simplest case, consider a business process with two security alert states: normal and lock-down. "Normal" is the default security state; the enterprise proceeds without any special considerations beyond the policies enforced in the normal day-to-day workflow of this business process. The security officers and business process owners have together also defined a set of changes to this business process that should go into effect whenever the business process is "under attack" or otherwise vulnerable (e.g., vulnerable to an identified and determined adversary, or vulnerable to potential violations of a governmental regulation during some critical time period). When applied to the appropriate pieces of the business process, these set of changes comprise the "lock-down" security state.

A key aspect of this feature is that an enterprise or business process owner may want to enter this "lock-down" security state quickly and only for a temporary time period. Once the threat or vulnerability has passed, the system should revert to the policy characteristics defined for the "normal" security state. It would be too slow, error-prone, and tedious to edit each of the pieces of a business process every time the enterprise or business process owner wanted to enter or exit the "lock-down" security state.

To implement this capability, one embodiment would create a set of log events that would automatically be applied when the security knob was set to a pre-defined setting. The log events for the "lock-down" security state described above could be captured by simply having the authorized administrator perform the changes to the current business process (i.e. "normal" security state), having the system log and store those changes under the appropriate security setting identifier (i.e., "lock-down"), and not having those changes actually applied to the database at the time of definition. The log events for the transition from "lock-down" to "normal" are simply those used to revert from the "lock-down" change.

To keep the security setting coherent, the system would ask the user if he or she also wanted to change, for example, the "lock-down" security state while the authorized user was making changes to the business process under the "normal" security state.

Those of ordinary skill in the art should recognize the methods of extending this two-setting security knob example and implementation to one that implements an n-setting security knob, for any specific n greater than 2.

Policy Deletion

Since the system does not have access to all of the data objects 32 protected by a control policy 14 when that policy is modified, we must be careful when "deleting" a control policy. First, we cannot reuse a control policy identifier from a "deleted" control policy for a new policy, since any data object 32 protected by the "deleted" policy would then appear to be part of the new control policy. We might also want some privileged user to be able to recover data objects from "deleted" control policies.

In the preferred embodiment, we use a globally unique identifier (GUID) as the identifier on a control policy 14, ensuring that no two control policies 14 ever get the same identifier. When an authorized administrative user deletes a control policy, the system removes the control policy from the system (possibly logging the action and the deleted information) so that data objects protected by the "deleted" control policy will appear as data objects that users are not authorized to access. Recovering a protected data object is handled through the "disaster recovery" mechanism described later.

Encryption and the Control Policy Tag (CPT)

Figure 8:
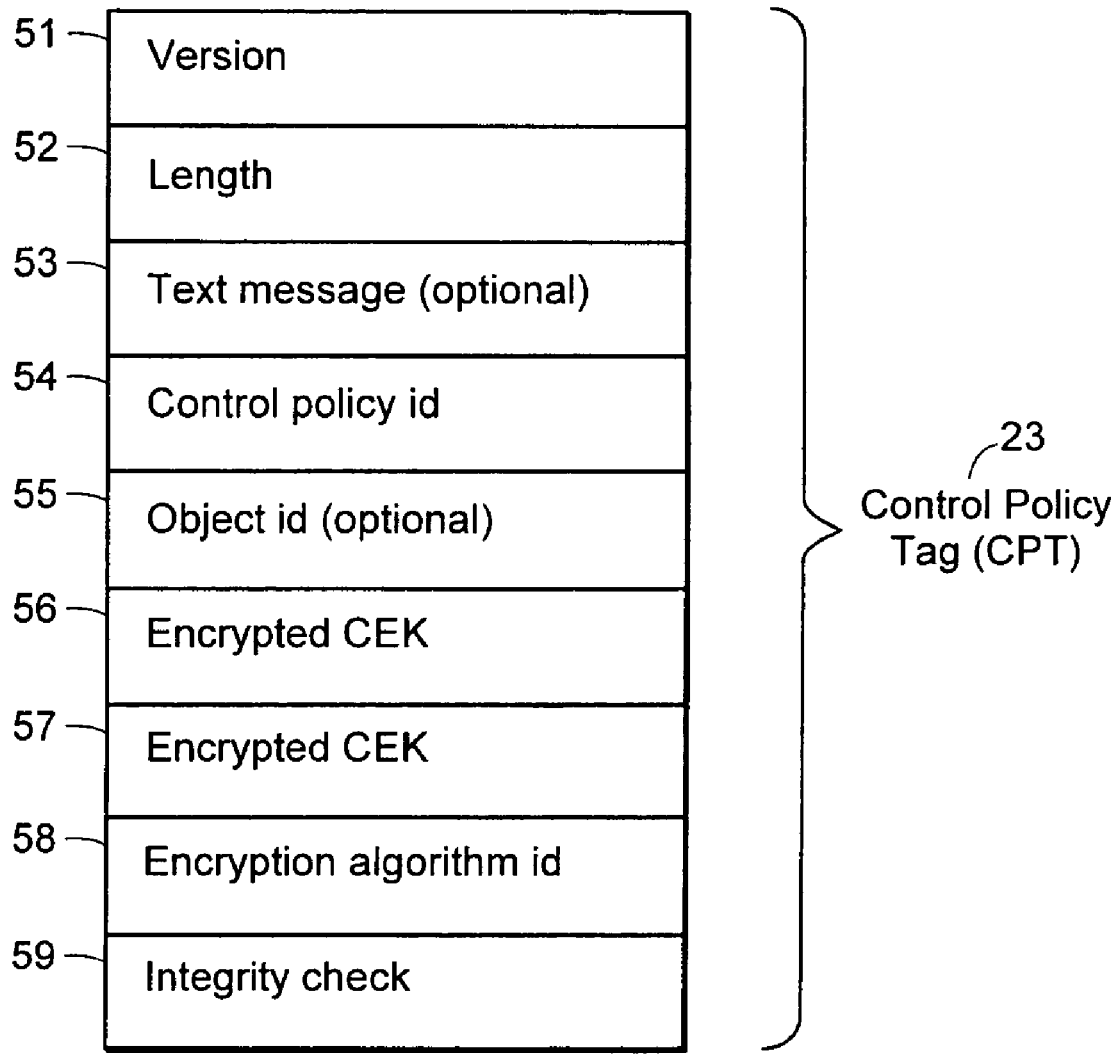
FIG. 8 is a schematic illustration of a control policy tag.

To ensure continuous protection of and control over a data object 22, a preferred embodiment of the current invention encrypts the data object 22 when it is not being accessed by rights-management-aware application. To each encrypted data object 22, the system attaches a Control Policy Tag (CPT). FIG. 8 is an abstract representation of the control policy tag 23 of the protected data object 32 in FIG. 6. The CPT contains the content encryption key (CEK) used to encrypt the data object 22. (We describe all of the fields of the CPT below.) The CPT is also the mechanism by which policies in the rights management system are associated with data objects. The combination of an encrypted (or encryptable) data object 22 and its CPT is called a protected data object 32.

For each data object 22, the rights management system generates a pseudo-random number that it uses as a symmetric key for encrypting and decrypting the data object 22. This process effectively produces a unique CEK for each data object. The control policy tag 23 in FIG. 8 is a data structure with fields that provide identity information, encryption information, and integrity information. Though the fields may appear in any order, a client agent 26 must always be able to find and interpret the CPT version 51 and length 52 fields.

The version field 51 identifies the version of the CPT structure being used. This field allows the system designers to change the format or contents of the CPT in the future and yet still be able to access content protected by old as well as new CPT structures (see FIG. 14 and its associated explanation below).

The version field 51 may begin with a "magic number" that content filtering applications can use to identify the data object 32 as one encrypted and protected under the current invention. This "magic number" could, for example, be used by anti-virus scanning applications to know that the protected data object 32 is encrypted (and presumably free of viruses due to a scan before encryption).

The length field 52 specifies the size of the CPT in bytes.

The text message field 53 is an optional field that explains to an unauthorized user (or users executing programs not under control of the rights management system) that the attached data object 32 is protected and where to go to get more information. This field is optional; some deployments may choose greater secrecy (no information provided to unauthorized users) over ease-of-use concerns (informing users how they can become part of the rights management system).

The control policy id field 54 identifies the control policy 14 that protects the attached data object. This field contains a globally unique identifier (GUID). The control policy id field 54 may also specify (e.g., via a URL) the policy server 29 in whose name space the GUID is known.

The object id field 55 is another optional field; it specifies a unique identifier for each data object 22.

Each protected data object 32 is encrypted with a secret key, called the Content Encryption Key (CEK), and this key is stored in at least two places in the CPT structure 23, labeled Encrypted CEK 56 and 57. One of these two fields 56, 57 contains the CEK encrypted with the policy server's KEK. The other field contains the CEK encrypted with the Key Encryption Key (KEK) of the policy identified in the control policy id field 54. The KEKs may be either symmetric or asymmetric keys. For the rest of the description of the preferred embodiment, we will assume that a KEK comprises a public/private key pair.

Another embodiment may include additional KEK fields that support role-based KEKs. In this manner, an administrator could specify unique key properties (e.g., shorter off-line access) for certain roles.

Since an embodiment of the present invention may use one or more different content encryption algorithms, the encryption algorithm id field 58 identifies the actual algorithm and other definable properties (e.g., key length) used to encrypt the data object with the CEK.

The final field, the integrity check field 59, is used to ensure that no one has tampered with the fields in the CPT 23. It may contain, for example, a secure hash of the entire CPT.

If the data object is tagged but not encrypted, the two encrypted CEK fields 56 and 57 and the encryption algorithm id field 58 are zeroed.

Control policies 14 are considered an integral part of a protected data object 32, accompanying the data object even as it moves among computers and their internal structures (e.g., file systems and memory buffers). The CPT, which references the governing control policy through the control policy id field 54 and contains the CEK secured by the control policy's KEK, is propagated with the encrypted data object 22 until explicitly removed by an authorized user through an embodiment of the rights management system of the present invention.

An explicit decision of the present invention is to allow multiple data objects 32 to refer to and be protected by a single control policy 14. The CPT structure described above clearly supports this decision. The embodiment also emphasizes the fact that the value in the control policy id field 54 of the CPT does not uniquely identify a document (as a unique document identifier would do).

The policy server 29 of FIG. 6 stores only the details of control policies 14 and not the association between data objects 32 and control policies 14. The association between data objects and control policies is stored only in the CPT 23 of the protected data objects 32. This design implies that the storage of the policy server 29 dedicated to policies 14 scales in proportion to the number of control policies 14 defined. The storage of the policy server is not affected by the number of unique protected data objects 32. It is also not affected by the number of copies of these protected data objects.

The preferred embodiment of the present invention has the CPT 23 located in front of the data object 32 (i.e. the CPT is encountered before the data object when scanning a protected data object 32 starting with the first byte of the protected data object). A different embodiment could place the CPT at the end or at any other explicit location within the protected data object 32.

The preferred embodiment allows both the policy server 29 and the client agent 26 of FIG. 6 to construct CPTs 23.

Reference Monitoring

Figure 9:
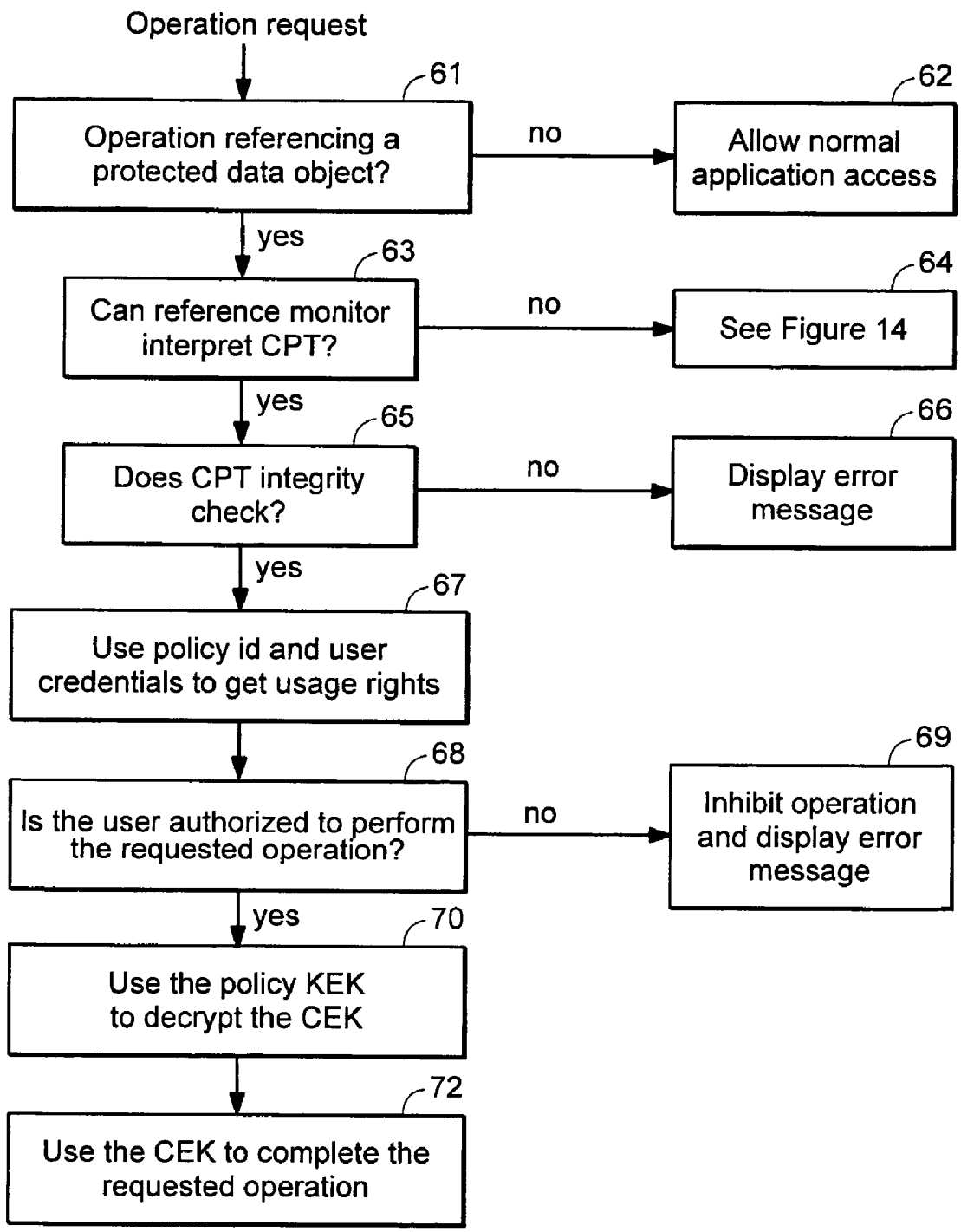
FIG. 9 is a flow diagram of accessing a protected data object.

FIG. 9 describes the logic followed by the reference monitor 24 of FIG. 6 on an operation that accesses a protected data object 32. Given a particular operation, the reference monitor 24 in step 61 first determines if the operation accesses a protected data object 32. This check involves looking for a CPT 23 on the data object. If no CPT exists, the reference monitor 24 allows the application 21 to continue at step 62. If a CPT 23 exists, the monitor 24 in step 63 checks the CPT's version field 51 and determines if the version of the CPT is the current version. If it is not, the reference monitor proceeds to step 64, which is explained in FIG. 14.

If the monitor 24 can interpret the CPT 23, the monitor in step 65 proceeds to check the integrity of the CPT via field 59 (FIG. 8). If the CPT has been tampered with, the monitor 24 displays an error message in step 66; otherwise, in step 67 it uses the control policy id (field 54, FIG. 8) in the CPT along with the user's authentication credentials to determine the user's usage rights for this protected data object 32. Given a set of usage rights, the monitor in step 68 determines if the user is authorized to perform the requested operation. If not, the monitor 24 in step 69 inhibits the application 21 from performing the requested operation and displays an appropriate error message.

If the user appears in multiple roles under the corresponding (associated) control policy 14, the preferred embodiment aggregates the usage rights for each of the roles containing the user. This aggregation yields a set of usage rights that contains all of the positive rights of that user's individual roles. Clearly, another embodiment might use a different aggregation method.

If the operation is authorized, the monitor 24 in step 70 uses the KEK of the control policy 14 identified in the CPT to decrypt the CEK used to encrypt and decrypt the contents of the subject protected data object 32. The sections on CPT update and disaster recovery below describe some exceptional conditions that may occur during the processing of step 70 in some embodiments.

Finally, given a decrypted CEK, the monitor 24 in step 72 uses the CEK to either decrypt the encrypted contents on a read operation or encrypt new contents on a write operation.

Architecture of Client Agent 26

Figure 10:
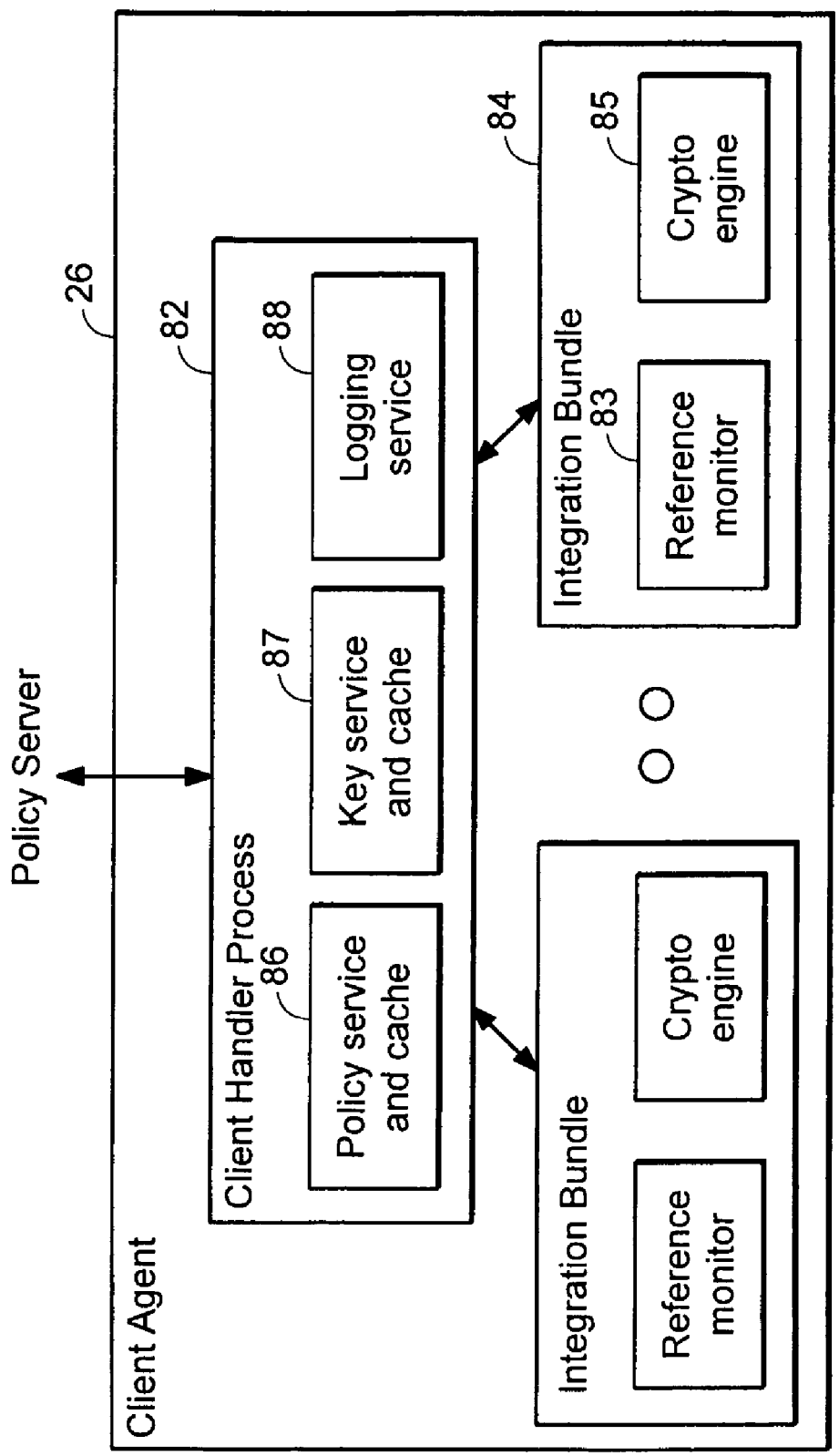
FIG. 10 is an architectural block diagram of the client agent in another embodiment of the present invention.

FIG. 10 illustrates the details of the preferred embodiment of the client architecture of the present invention. This embodiment splits the client agent 26 of FIG. 6 into a client handler process 82 and an integration bundle 84. There is one client handler process 82 per user machine. The integration bundle 84 could be implemented as a single dynamically linked library that would be loaded into each process running on the user machine. The integration bundle 84 contains the reference monitor 83 and crypto engine 85 analogous to those 24, 25 described in FIG. 6.

The client handler process 82 acts as a local proxy for the policy server 29 of FIG. 6. The client handler process 82 contains a policy service and cache 86 for caching and managing control policies 14 received from the policy manager 27 of FIG. 6, and it contains a key service and cache 87 for securely caching and managing KEKs from the key manager 28 of FIG. 6.

Under this embodiment, the reference monitor 83 requests the policy KEK from the key service and cache 87 in the client handler process 82 in order to extract the CEK for a protected document from its CPT (step 70 of FIG. 9). Once the CEK is obtained, the integration bundle 84 scrubs the KEK from its memory and passes the CEK to the crypto engine 85.

The client handler process 82 also includes a logging service 88 for collecting log information from each integration bundle 84 and eventually passing that log information back to the policy server 29 of FIG. 6.

Figure 11:
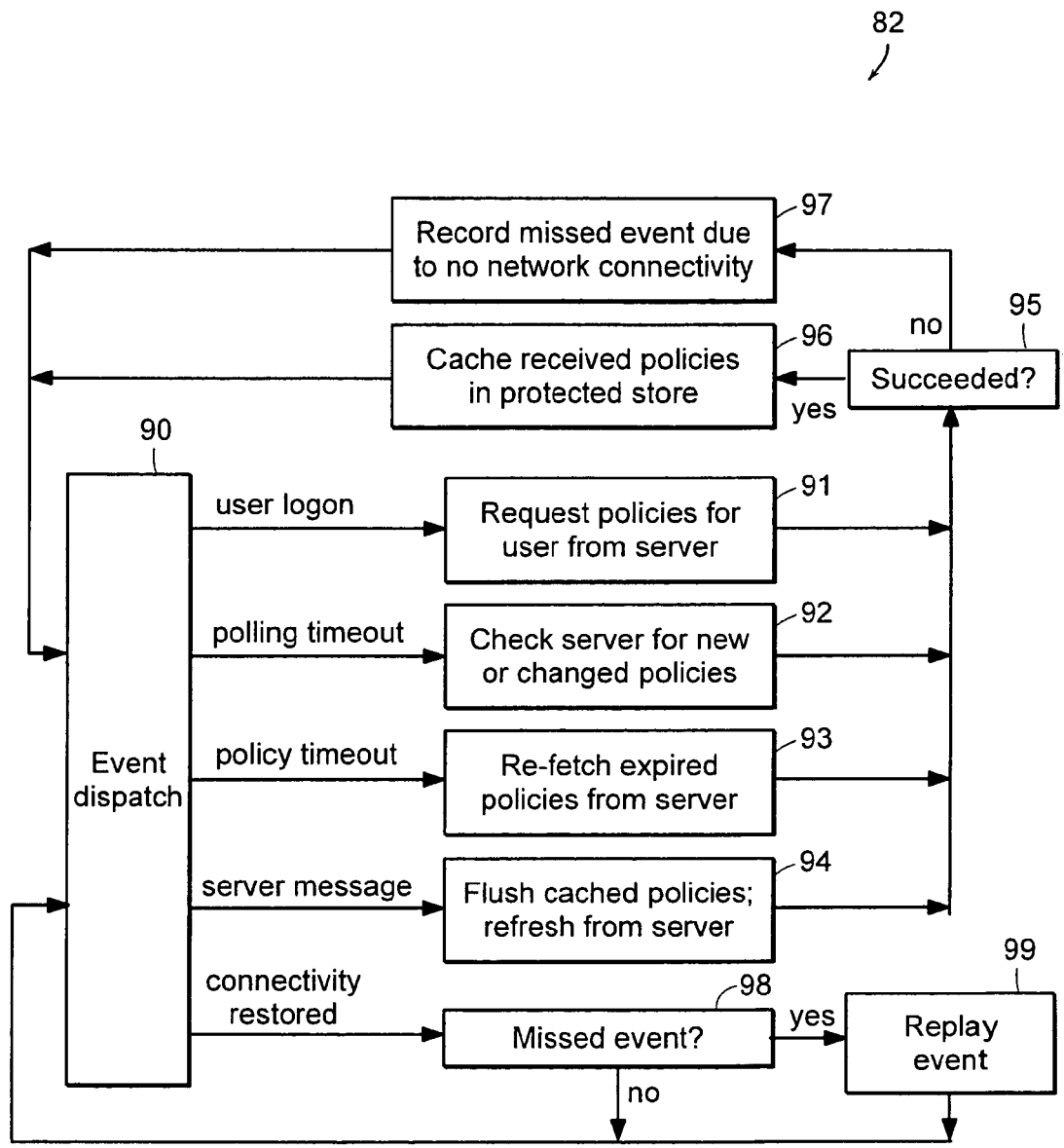
FIG. 11 is a flow diagram of client handler processing.

FIG. 11 describes the logic followed by the client handler process 82 of FIG. 10. The handler sits in an event loop waiting for one of the several events labeled on the outgoing edges of step 90. When a new user logs in and authenticates to the client machine, the client handler process 82 will request all policies 14 on the policy server 29 related to the user, as stated in step 91. On a regular polling interval, the handler process 82 in step 92 checks the policy server 29 for new policies 14 related to the logged-in user or changes to the cached policies 14.

Some control policies 14 state how long they can be cached and used off-line. When such policies timeout, the handler process 82 in step 93 will re-fetch expired policies 14 from the policy server 29. The control policy KEK can also expire; the embodiment's handling of this time out condition is described below in the section labeled "Expired KEKs and CPT Update."

The preferred embodiment currently implements a three-way toggle (labeled Basic, Standard, and High) for setting control policy KEK expiry periods and cache timeout values. The policy KEK validity period and length of time before cached policy timeout are longer in the "Low" setting than the "Medium" setting, providing more potential exposure if a KEK is compromised or a control policy changed. The "High" setting provides the highest level of security and thus lowest level of exposure; however, it also implies that users can work off-line for shorter periods of time. Each deployment of the embodiment of the present invention will select control policy KEK expiry periods and cache timeout values according to their level of risk tolerance and need for off-line use of protected data objects 32.

Finally, the policy server 29 can prompt the handler processes 82 of online clients to flush and refresh their cached policies, as stated in step 94. Off-line clients will synchronize their cached policy stores with the policy server 29 when again connected.

For steps 91-94, the client handler process 82 in step 95 will check to make sure that the necessary network communication occurred. If everything was successful, the handler process 82 in step 96 will cache the received control policies 14 in secure storage. If the client had no network connectivity with the policy server 29, the handler process 82 in step 97 will record the missed event for replay later in steps 98 and 99, after network connectivity is restored.

Expired KEKs and CPT Update

The CPT 23 of a protected data object 32 is the only structure in the present invention that contains the CEK used to encrypt the data object 32. As explained earlier, the CEK is encrypted with the KEK of the control policy 14 identified in the control policy id field 54 of FIG. 8. To limit the risks associated with a compromised KEK, the system limits the lifetime of such encryption keys. This means however that a protected data object 32 in the field may be no longer accessible once its control policy KEK expires. Since the system does not have access to all data objects protected by a control policy 14 when the policy's KEK expires, the system must have a mechanism for allowing access to data objects protected with an expired KEK and eventually lazily updating the CPT 23 of those data objects with the control policy's current KEK.

The policy server 29 of FIG. 6 is responsible for defining and managing the lifetime of each control policy KEK.

The preferred embodiment of the present invention assigns a unique identifier to each KEK within a control policy 14. Using key manager 28, the policy server 29 stores the current KEK and maintains a history of KEKs for each active control policy 14. This history may contain all KEKs ever generated for a control policy 14, or it may contain only a limited number of the most recent expired KEKs for that policy.

To let the client agent 26 of FIG. 6 determine if it has the correct KEK for decrypting the CEK of a protected data object 32, the encrypted CEK fields 56 and 57 of FIG. 8 include the (plaintext) value of the KEK unique identifier used to encrypt the CEK. To increase the probability that the client of an authorized user has the KEK necessary to decrypt the CEK of a protected data object 32, the preferred embodiment of the present invention (e.g., policy server 29) distributes to the client agent 26 not only the current KEK for a control policy 14 but also some portion of the most recent stored history of KEKs for the control policy. The length of the distributed history is less than or equal to the length of the history maintained on the policy server 29 by key manager 28.

Figure 12:
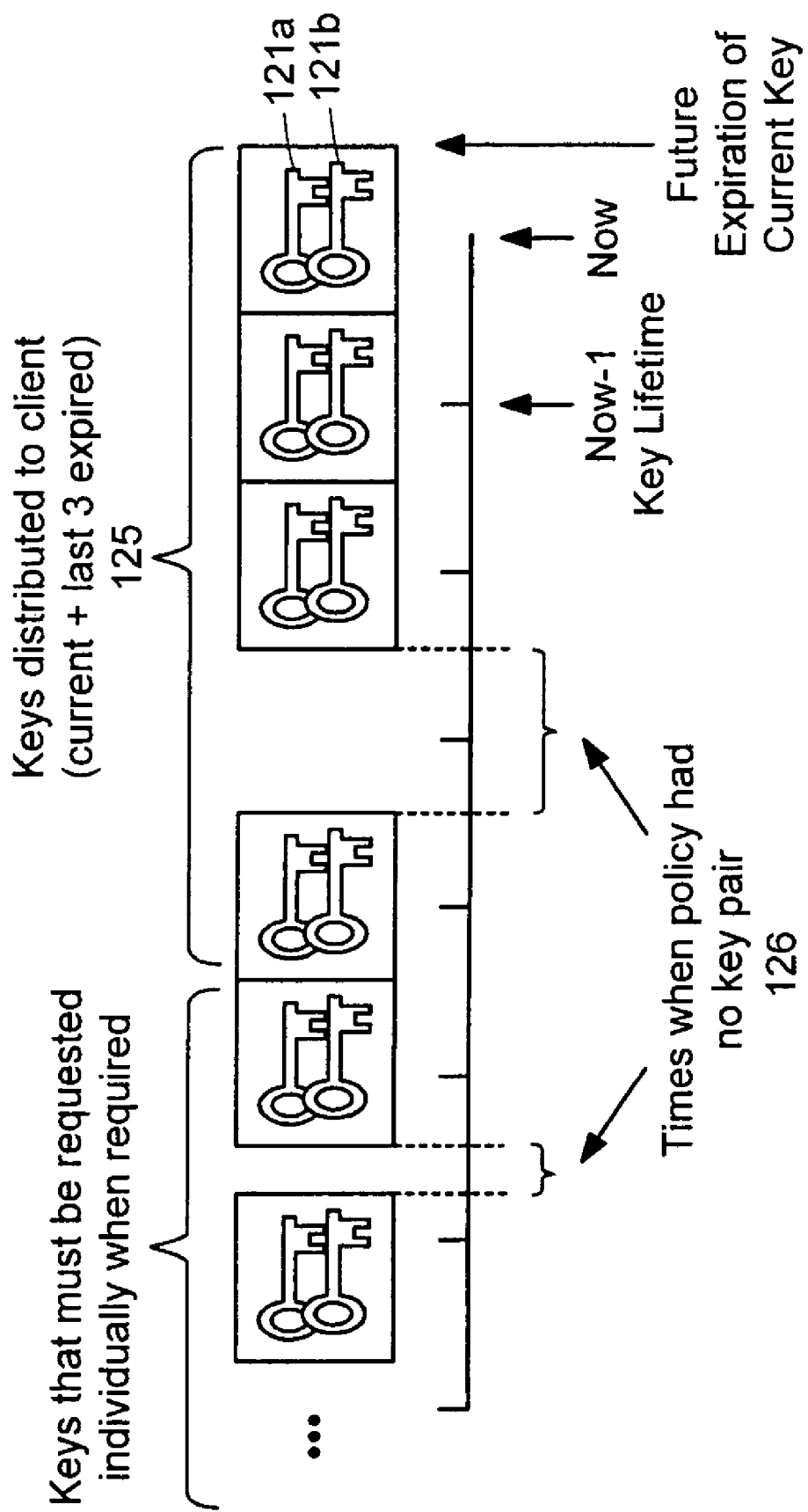
FIG. 12 is an illustration of key encryption, key distribution and expiry.

We will consider two cases associated with an attempt to access a protected data object 32 with a CEK encrypted with an expired control policy KEK; we consider further cases in the later section entitled "Disaster Recovery and CPT Version Control." Both of the current cases assume that the policy server 29 maintains a complete history of expired KEKs and distributes only a limited number of the most recently expired keys to the client agent 26. We assume that it is not practical for the policy server 29 to distribute a complete history of expired KEKs to every client agent 26. FIG. 12 illustrates the scenario for an embodiment that distributes the current and past three expired KEKs 125 to the client agent 26; the figure assumes that a KEK comprises a key pair 121a,b.

In the first case, if the expired control policy KEK is one of the ones sent by the server 29 in the distributed history, the client agent 26 is able to decrypt the CEK, use this CEK to access the protected data object 32, and create a new CPT for the protected data object 32 that uses the control policy's current KEK. All of this occurs without any involvement of the user or further communication with the policy server 29, i.e. it could occur even while the client was off-line.

The second case solves the problem that the expired KEK is not part of the history distributed to the client agent 26. To recover from this situation, the client agent 26 must be online and able to communicate with the policy server 29, since the policy server maintains a complete history expired KEKs for the control policy 14 of the protected data objects 32. The preferred embodiment simply has the client agent 26 request the particular expired KEK of the control policy 14 of interest. When the policy server 29 responds with the appropriate archived KEK, the client proceeds as above (as if it found the expired KEK in the distributed history).

FIG. 12 also illustrates that there may exist times when a control policy 14 has no current KEK, due to the expiration of the current KEK. The preferred embodiment of the current invention generates a new KEK for a policy only when a client agent 26 asks for the user-specific usage rules and current KEK of a control policy (step 91 of FIG. 11). To guarantee that the client agent 26 does not have to wait an excessive amount of time for step 91 of FIG. 11 to complete, the policy server 29 does cache a set of pre-generated KEKs. This cache of KEKs is used to satisfy demands for a new current KEK in response to a client agent's 26 request for a control policy 14 without a current KEK. The cache of pre-generated KEKs is managed using a simple low and high watermark scheme well known to those practiced in the art. This approach in the preferred embodiment guarantees that the policy server 29 does not generate a large number of unused KEKs that it would need to archive for control policies 14 with protected data objects 32 that experience long periods of inactivity.

Persistence Models for Protected Data Objects

The present invention supports two explicit persistence models for protected data objects 32. In general, the protected data objects 32 of a control policy 14 are either considered permanent or ephemeral assets.

In the "permanent" model, protected data objects 32 within a control policy 14 are considered permanent assets that should be protected and never lost. The preferred embodiment implements this model by encrypting the CEK of each protected data object 32 with the public master KEK of the policy server 29. This encrypted value is stored in the one of the encrypted CEK fields (e.g., field 56 of FIG. 8); the other field (field 57 of FIG. 8) contains the CEK encrypted with the current KEK of the control policy identified in field 54 of FIG. 8.

The next section, entitled "Disaster Recovery and CPT Version Control", describes how the preferred embodiment uses the private master KEK to be always able to recover the CEK of a protected data object 32. For now, we simply state that the master KEK of the policy server 29 also has a validity period, except that the validity period of the master KEK is typically longer than those assigned to control policy KEKs. The validity period can be longer because, as explained in the next section, the private portion of the master KEK is never distributed to the client agents 26 (i.e., it is used only on the policy server 29). Since the master KEK has a validity period, the preferred embodiment also associates a unique identifier with each generated master KEK of the policy server 29, and this identifier is stored with the encrypted CEK in field 56 of FIG. 8. Thus, contents stored in the storage for fields 56 and 57 in FIG. 8 are identical.

In the "ephemeral" model, protected data objects 32 within a control policy 14 are considered ephemeral assets that should be protected for some pre-determined period of time and then destroyed. By "destroyed" we mean that it is theoretically impossible to recover the plaintext of the protected data object 32.

The preferred embodiment implements the "ephemeral" model by encrypting the CEK in the CPT 23 not with the policy server's master KEK but with a "policy master" KEK (field 56 of FIG. 8). The system never encrypts the CEK of the protected data object 32 with the server's master KEK. The policy master KEK has all of the same attributes as the server master KEK (e.g., it has a very long expiration time, never leaves the server 29, and supports recovery of the CEK as long as it is archived).

When the owner of an ephemeral policy decides that it is time to permanently destroy all data objects associated with that policy 14, he or she simply requests that all archived copies of the policy master KEKs for that policy be deleted on the policy server 29.

Disaster Recovery and CPT Version Control

There are many types of disasters that an embodiment of the present invention must protect against and recover from (e.g., loss of the policy store and restoration of that store from backups). In this section, we focus on two unique aspects of the present invention's disaster recovery mechanisms. The first concerns embodiments that maintain only a limited history of control policy KEKs (or have through some catastrophic event lost all of the archived KEKs for one or more control policies 14). The second describes support within the present invention for forward and backward compatibility of CPT formats. This feature is again necessary to address the dynamic nature of the enterprise security space and to ensure that the system is always able to recover the CEK stored in the CPT 23 of a protected data object 32 that may not have been referenced for years.

Figure 13:
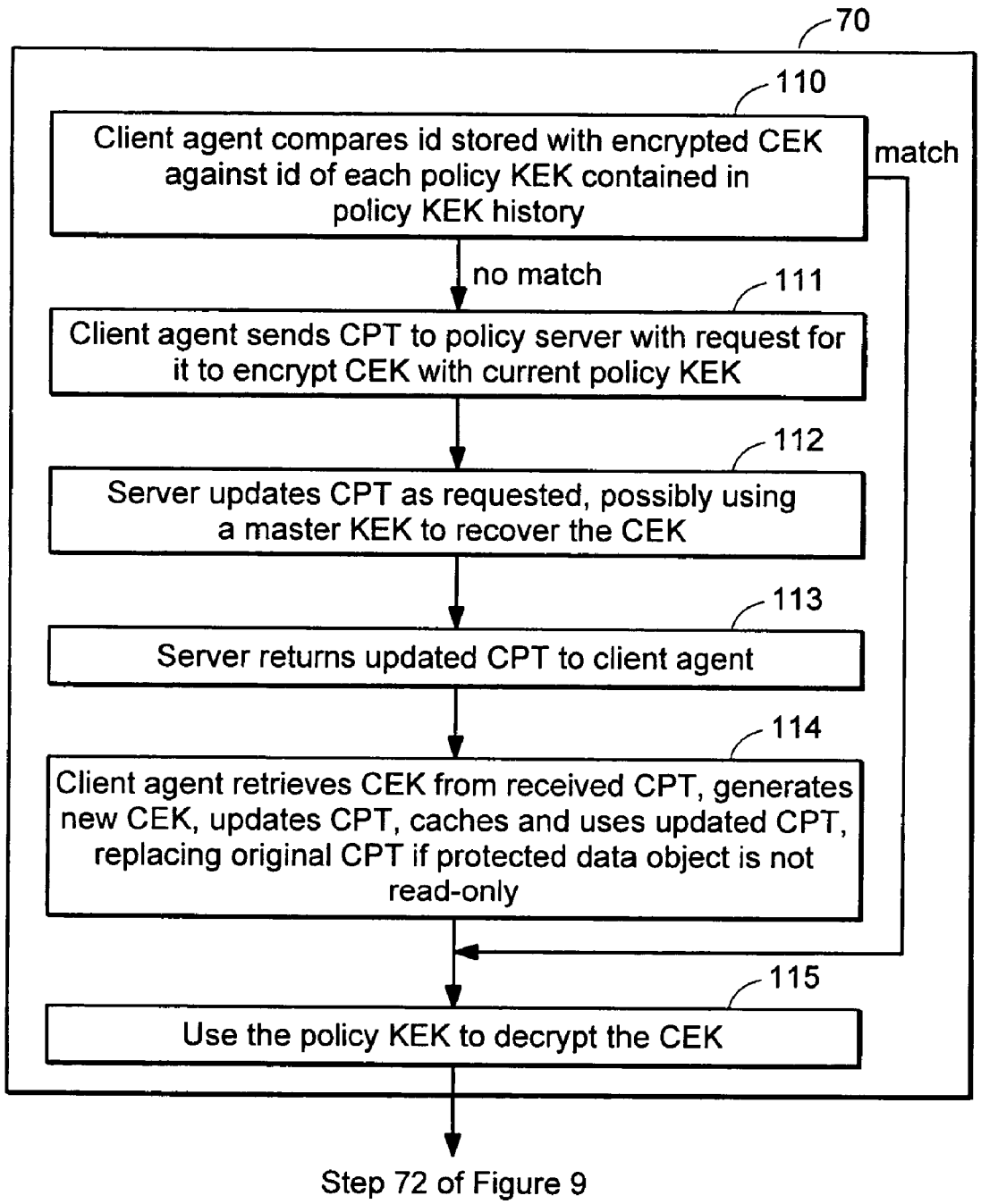
FIG. 13 is a second flow diagram of accessing a protected data object.

FIG. 13 expands upon the logic followed by the reference monitor 24 of FIG. 6 in step 70 of FIG. 9. At this point, the monitor 24 attempts to extract the CEK of the protected data object 32 from the CPT 23 (both of FIG. 6). The client agent 26 already has the current KEK and some number (possibly zero) expired KEKs of the subject control policy 14. The monitor 24 compares (step 110) the unique identifier of the current KEK with the unique identifier (stored in field 57 of FIG. 8) of the KEK used to encrypt the CEK. If the identifiers match, the monitor 24 proceeds with decryption of the encrypted CEK, as stated in step 115 of FIG. 13.

As described above, the KEK for the control policy can expire; the embodiment identifies such an occurrence by noticing that none of the unique identifiers of the stored KEKs match the unique identifier of the KEK used to encrypt the CEK. To recover, in step 111, the monitor 24 extracts the CPT 23 and sends it to the policy server 29 with a request for the server to encrypt the CEK with the current policy KEK. The server 29 in step 112 recovers the CEK by using the appropriate master KEK (server or policy), as indicated by the unique identifier stored with the encrypted CEK. The server 29 in step 113 returns the updated CPT to client agent 26. The client agent 26 in step 114 retrieves the CEK from the received CPT, generates a new CEK, wraps it into an updated CPT, and replaces the original CPT 23 if the protected data object 32 is not marked read-only or stored on read-only media, and proceeds to step 115 using the updated CPT. The client may cache the received CPT in the case where the data object 32 is marked read-only.

The preferred embodiment treats the versioning of CPT formats as a disaster recovery problem. This approach allows the embodiment to distribute client agents 26 with code that only knows how to interpret the current CPT format and how to recover from disasters.

Figure 14:
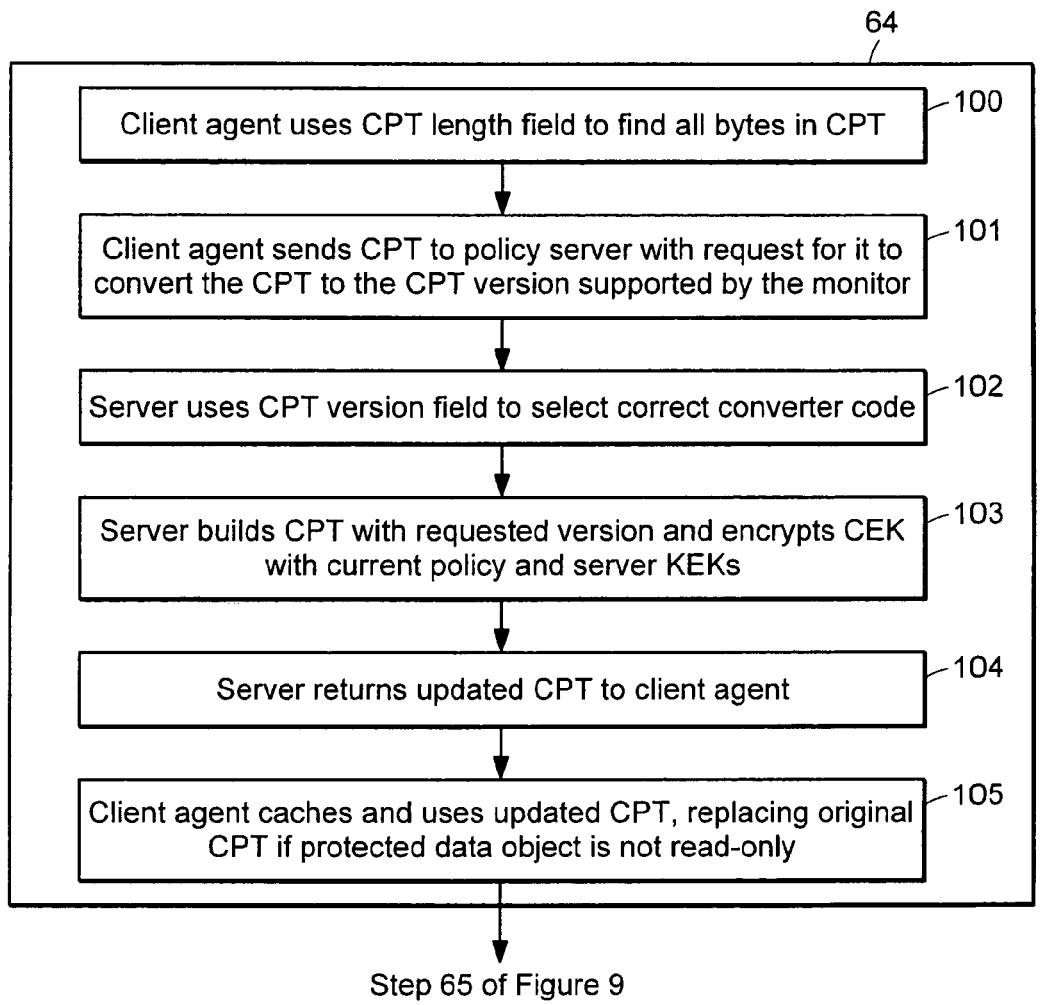
FIG. 14 is a third flow diagram of accessing a protected data object.

FIG. 14 describes the logic followed by the reference monitor 24 of FIG. 6 when it gets to step 64 of FIG. 9. The monitor 24 reaches this logic when the version of the CPT 23 of a protected data object 32 (both of FIG. 6) does not match the CPT version supported by the monitor 24. The reference monitor 24 in the client agent 26 in step 100 extracts the entire CPT from the protected data object 32. In step 101, the client agent 26 sends the extracted CPT to the policy server 29 with a request to convert the CPT to the specified version that the client agent 26 supports. The server 29 in step 102 uses the version field 51 of the CPT to select the correct converter routine, which simply maps the fields in the given version of the CPT data structure to the fields in the specified version (possibly using a canonical intermediate form). Notice that only the server 29 needs to have the entire set of converter codes. During this conversion, the server 29 in step 103 decrypts the CEK using either the indicated control policy KEK or the master KEK, and re-encrypts the CEK with the current control policy KEK and master KEK. The server 29 in step 104 returns the updated CPT to client agent 26. The client in step 105 extracts the current CEK, renews the CEK, updates the received CPT, caches the updated CPT, replaces the original CPT if the protected data object 32 is not marked read-only or stored on read-only media, and proceeds to step 65 of FIG. 9 using the updated CPT.

Read-Only Protected Data Objects

So far, the description has generally assumed a collaborative environment involving the creation and modification of protected data objects 32. The preferred embodiment also supports a publish-only model of document generation and distribution. In particular, the preferred embodiment allows the business process administrator to indicate that the KEK for a control policy 14 should always remain valid. This option is desirable when the administrator knows that the data objects protected by the control policy 14 are read-only or are stored on read-only computer media. Even though the system cannot update the CPT 23 of a read-only data object 32, it may still want to expire the policies 14 associated with read-only documents in the client's policy cache 86 to restrict the length of time allowed for off-line viewing of read-only data objects.

Policy Identification and Data Object Transfer

Figure 15:
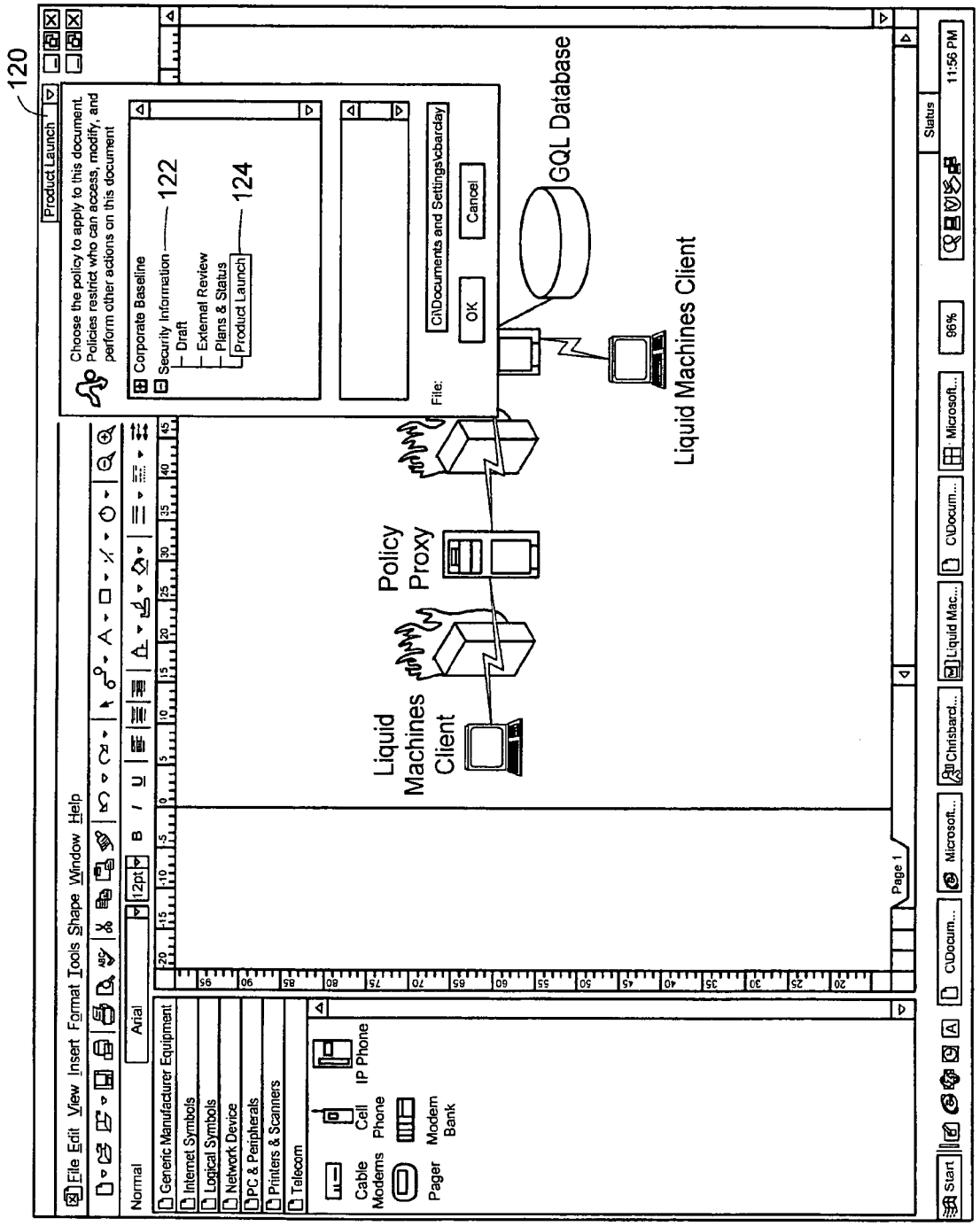
FIG. 15 is an illustration of control policy display.

FIG. 15 illustrates how the preferred embodiment displays the name for the control policy 14 currently protecting the data object displayed in a computer window. The subject control policy name is displayed in a drop-down window object called the droplet control 120. When activated, the drop-down window displays the name of the business process 122 containing the active control policy 124, and the other business processes 12 and control policies 14 that the user may transfer the protected data object to.

In one embodiment, an ActiveX Window supports droplet control 120. Contents and hierarchy of same are obtained from policy server 29 via cache 86, tag 23 and/or client handler 82 as further explained below.

Figure 16:
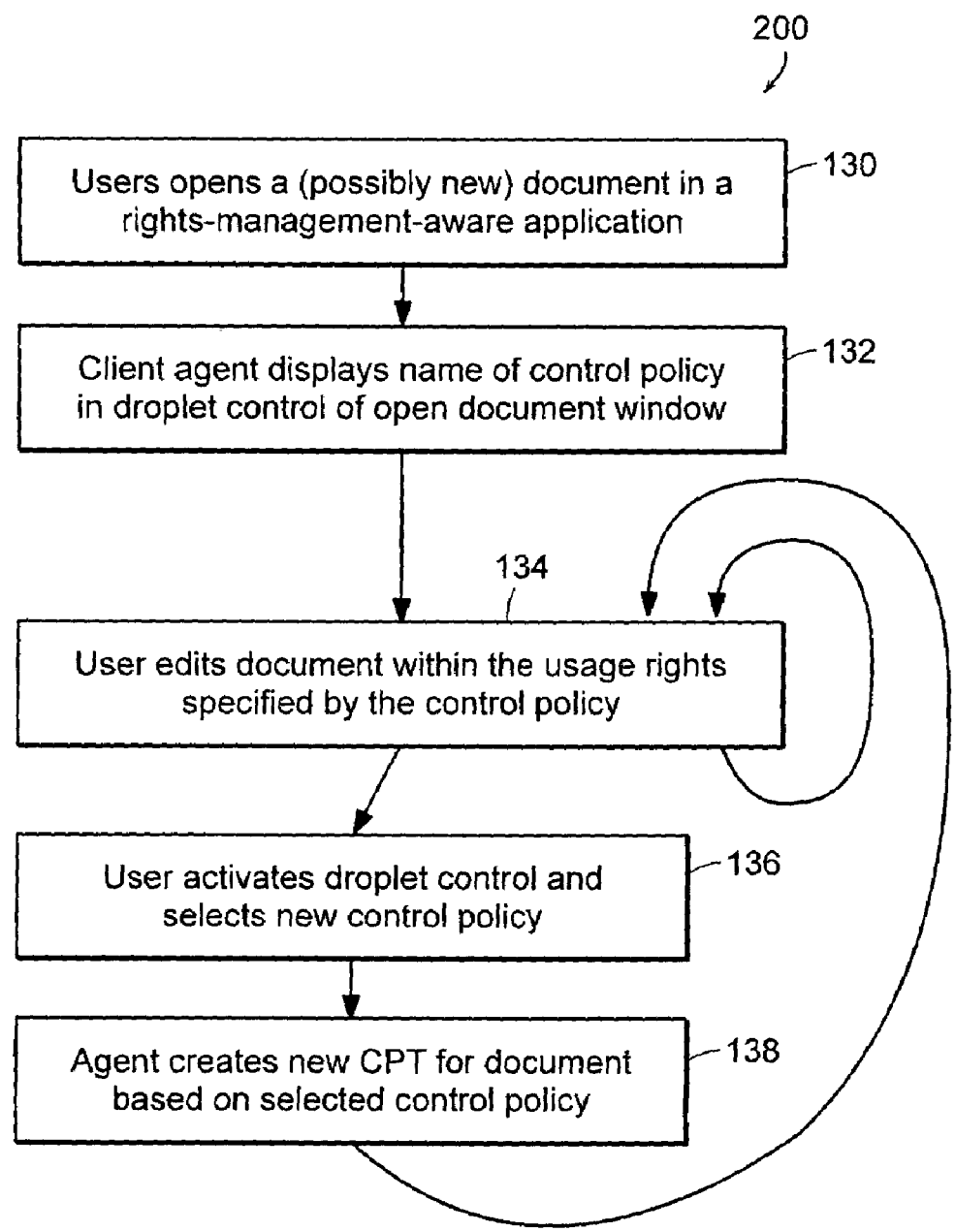
FIG. 16 is a flow diagram of policy transfer logic.

FIG. 16 describes the logic involved in transferring a data object (represented by a document) between control policies 14. The transferring of a protected data object 32 from one control policy 14 to another is an important aspect of a dynamic, distributed, and collaborative environment, as described earlier in reference to FIGS. 2-5. In particular, the preferred embodiment allows business process owners (i.e. business administrators) to specify the flow of information between control policies 14 within or between business processes 12. The business process owners define the flows while authorized users perform the actual transferring of protected data objects. Often a transfer will occur as part of normal workflow.

An authorized user in step 130 opens a document in a rights-management-aware application 21. This might be a new document 22 (data object), in which case the client agent 26 in step 132 displays the default "Unmanaged" control policy in droplet control 120. Alternatively, this might be an existing protected document, in which case the agent 26 in step 132 displays the name of the control policy protecting the document 22 in the droplet control 120. The user in step 134 edits and further manipulates open document within the usage rights specified by the control policy 14 for that user. The logic flow from step 134 back to itself represents the fact that such editing may continue for some unspecified and extended period of time.

At some point, the user in step 136 may decide to activate the droplet control 120 and select a new control policy 14 to which he would like to transfer the protected document. After selection, the agent 26 in step 138 creates a new CPT 23 with the selected control policy identifier in it and tags the document 22 with it. If specified in the control policy 14, an authorized user may in step 136 select the "Unmanaged" control policy, in which case the agent 26 in step 138 does not create a new CPT, deletes the existing CPT, and decrypts the document 22. After step 138, the user can continue to edit the document 22 under the constraints of the new control policy 14.

Each control policy 14 in the system records a list of users with the authority to transfer data objects 22 out of the protection provided by that control policy. The control policy 14 also contains a list of users with the authority to assign new data objects 22 to the control policy. In order for a user to transfer a data object 22 from its current control policy 14 to a new control policy, the user must be a member of the "transfer-out" list of the current control policy 14 and a member of the "assign-to" list of the new control policy 14.

"Transfer" rights are not necessary, i.e. the "transfer-out" and "assign-to" lists of a control policy 14 can be empty. However, in the preferred embodiment of the present invention, at least one of the roles in a control policy 14 will allow users to assign data objects 22 to the policy 14. If none of the roles has assign privileges, the policy 14 would not have any meaning (i.e., it would never have objects associated with it). The "assign-to" list may become empty because the privilege was needed only initially to assign data objects to the control policy 14. For instance, a member may have "assign-to" privileges during the initial creation of the policy and assignment of data objects to the policy. After this initialization, the "assign-to" privilege is removed and the policy 14 controls a fixed set of objects.

In general, the preferred embodiment supports three kinds of "transfers" within the hierarchy of business processes 12 (FIG. 1):

(a) An authorized user may be granted the privilege of changing the association between a data object 22 and its control policy 14 within a single business process 12.
(b) A user may also be granted the privilege of moving data objects 22 between business processes 12.
(c) A user may also be granted the privilege of moving data objects 22 out of the rights management system, i.e. the data object 22 resulting from the transfer is no longer managed or protected.

The types of transfers described above can be explicitly initiated by an authorized user through the droplet control 120 described earlier, or transfers can be implicitly initiated as a byproduct of some other electronic action undertaken by the authorized user. We refer to this latter category as "automatic transfers."

The policy 14 associated with a data object 22 may be changed automatically via merge operations (e.g., cut/paste operations). The preferred embodiment of the present invention implements the following kinds of automatic transfers on merge operations: If a protected data object 32 is pasted into an unmanaged data object, the targeted data object assumes the policy 14 of the pasted object. If the protected data object is pasted into a protected data object with a different policy 14, the target object maintains its policy and the paste is allowed to complete only if the source data object's policy allows transfer and the target data object's policy allows assign.

The preferred embodiment of the present invention implements "automatic transfers" by integrating a standalone transfer tool into a software component of an existing electronic business process. For example, a report generator for a large database system might be modified to use the standalone transfer tool to produce reports as protected data objects 32 under a pre-configured control policy 14. As another example, an email server might be configured to use the standalone transfer tool as a type of filter (i.e. exploiting those interfaces used by anti-virus filters) to transfer automatically data objects from one control policy 14 to another based on the people or groups in the "to" and "from" fields of an email message. An automatic transfer would take place only if the sender of the email message had the appropriate transfer rights. Such an embodiment would also want to employ digital signatures to ensure that the email message actually came from the person specified in the "from" field.

Off-line Collaboration

Collaboration in a dynamic and distributed environment implies that the only authoritative copy of a protected data object 32 may reside in the field, away from the policy server 29, and in locations not accessible by the business process owner. A system in support of dynamic, distributed, and collaborate environments must make it easy for two (or more) authorized users to generate and share protected data objects 32 both on and off-line. The preferred embodiment of the present invention supports such a goal with the only criterion that the authorized users must have had some recent access to the policy server 29, where "recent" means within the cache timeout for the control policy 14 under which they wish to collaborate. In other words, collaboration is driven by pre-defined business processes 12 and not by pre-registered data objects 32.

Figure 17:
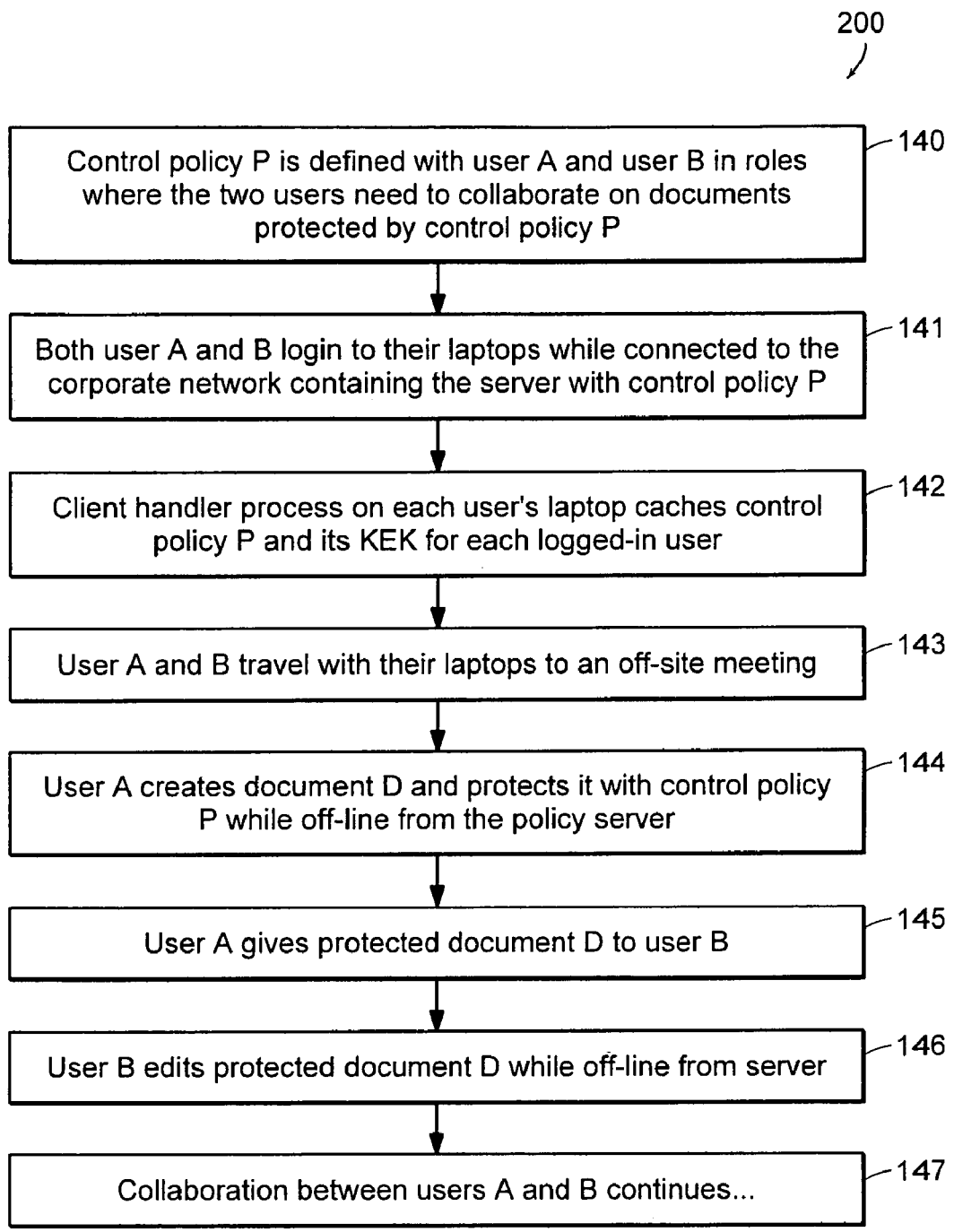
FIG. 17 is a flow diagram of off-line collaboration between two users.

FIG. 17 presents a flow diagram illustrating collaboration between two users within a rights management system 200 based on the present invention, where the collaboration occurs through a document (data object 22) that was never known to the policy server 29. Step 140 begins with an administrator creating a control policy P that includes both users A and B in roles. Users A and B in step 141 are logged in to their laptops connected to the corporate network where the policy server 29 is located. In step 142, the client handler processes 82 on the users' laptops cache the control policy P and its KEK. Users of A and B in step 143 then disconnect from the corporate network and take their laptops to an off-site meeting. At this point, the client handler processes 82 are prepared to permit any collaborative activity within the bounds of the cached control policies 14; the client handler processes 82 act as trusted agents of the rights management system 200.

While off-line, user A in step 144 creates a sensitive data object D (in the example, a document) and protects it with control policy P. This action takes place while user A is disconnected from the policy server 29. Since control policy P is cached on user A's laptop, he or she is able to create and protect document D. User A in step 145 gives a copy of document D to user B. User B in step 146 is able to edit protected document D on his or her laptop while also disconnected from the policy server 29. The collaboration of users A and B around document D (or any other document protected by control policy P) continues in step 147, as long as no expiry periods occur.

Audits, Forensics, and Compliance

The preferred embodiment of the present invention supports logging of the activities (granted and denied) monitored and controlled by the client agent 26 of FIG. 6. The logging service 88 in FIG. 10 collects the log data from the individual rights-management-aware applications 21 and communicates the data back to the policy server 29. The collected information can then be reviewed and mined by the business process owner to support business needs, such as audits, forensics, and compliance.

Auditing the activities associated with the data objects 32 of a business process 12 does not necessarily require encryption of the identified data objects 32. In one embodiment of the invention, the identified data objects 32 may be simply "managed" and not "protected." In other words, auditing requires only that an identified data object 32 have a CPT 23; it does not require that the contents 22 of that data object 32 be encrypted.

The object id field 55 in the CPT 23 (FIG. 8) aids in audits, forensics, and compliance. It is a globally unique identifier generated when the client agent 26 first creates a protected data object 32. If the new data object 22 was generated from an existing protected data object (e.g., via a "Save As" command), a log record is written linking the new and existing data objects using their object identifier 55 values. Otherwise, the system 200 records that the new protected data object 32 was generated from scratch or from an unmanaged data object 22.

This example emphasizes the fact that the preferred embodiment of the present invention uses object identifiers only for audits, forensics, and compliance purposes. The embodiment does not use the object identifier 55 of a protected data object 32 for determining the control policy 14 or associated usage rules.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method for maintaining and managing control over content in a distributed context, said method comprising the steps of:
   storing control policies in a memory, associating content with the control policies by attaching to each content an identification of a respective control policy, for each content, the associating forming an association between the content and the respective control policy, wherein each control policy comprises at least
   (i) an indication of a set of users who may access the content,
   (ii) an indication of privileges granted to each user in the set, and
   (iii) an indication of a set of users who may define or edit the control policy; storing the control policies;
   upon a user requesting to access content, checking whether the user is indicated in the set of users who may access the content in the manner requested, based on the respective control policy of the content;
   for each content, maintaining the association between the content and the respective control policy independent of a computer structure encapsulating the content and separate from physical access to the computer structure encapsulating the content; and
   propagating the association between the content and the respective control policy to a derivative of the content.

2. The computer method for maintaining and managing control over content of claim 1, further comprising:
   allowing the user to access the content if the user is in the set of users who may access the content in the manner requested.

3. The computer method for maintaining and managing control over content of claim 1, wherein the step of storing control policies includes storing control policies on a control policy server; and
   the method further comprising the steps of:
   determining control policy server availability;
   if the control policy server is unavailable, determining a duration of time for which access rights are valid for the content; and
   allowing the user to access the content if the access rights are still valid for the content for the user.

4. The computer method of claim 3, further comprising the step of:
   caching a control policy associated with a content in a first user and a second user without registering the cached control policy with the control policy server;
   sharing the content in a collaborative manner between the first user and the second user within the bounds of the cached control policy.

5. The computer method of claim 4, wherein the content is created while the server is unavailable.

6. The computer method for maintaining and managing control over content of claim 1, further comprising:
   providing an interface for defining and editing a control policy by a set of users, based on the indication of who may define and edit the control policy and what modifications are permitted.

7. The computer method for maintaining and managing control over content of claim 1, wherein the control policy further contains an indication of one or more of: device constraints, location constraints, time-of-access constraints, and network connectivity constraints.

8. The method for maintaining and managing control over content of claim 1, wherein the control policy further contains an indication of users who may transfer a content out of the control policy and an indication of users who may assign the control policy to content.

9. The method for maintaining and managing control over content of claim 1, wherein a role within the control policy is a set of usage rights and a list of users, and wherein usage rights of a user appearing in multiple roles within the control policy are aggregated.

10. The method for maintaining and managing control over content of claim 1, wherein the content is encrypted.

11. The method for maintaining and managing control over content of claim 10, wherein the content is encrypted with a content encryption key, which is encrypted with a key encryption key of the control policy associated with the content.

12. The method for maintaining and managing control over content of claim 1, further comprising:
   transferring the content from the respective control policy to a second control policy.

13. The method for maintaining and managing control over content of claim 12, wherein the second control policy is at least one of:
   an unprotected content state and a control policy for which the user has privileges to assign content to that policy.

14. The method for maintaining and managing control over content of claim 12, further comprising:
   transferring the content automatically from one control policy to a second control policy upon occurrence of a predetermined event, wherein the second control policy is at least one of:
   a control policy for which the user has privileges to assign content to that policy and an unprotected content state.

15. The method for maintaining and managing control over content of claim 14, wherein the predetermined event is a business event determined by a creator of the control policy.

16. The method for maintaining and managing control over content of claim 14, further comprising:
   recording the transfer of the content in an activity log such that audit of changes to the content is enabled.

17. The method for maintaining and managing control over content of claim 1, wherein control policies are grouped into business processes.

18. The method for maintaining and managing control over content of claim 17, wherein business processes are organized hierarchically.

19. The method for maintaining and managing control over content of claim 18, wherein the hierarchy is used in limiting scope of content transfers between control policies.

20. The method for maintaining and managing control over content of claim 18, wherein default policies of one business process apply to other business processes as a function of the hierarchy.

21. The method for maintaining and managing control over content of claim 1, further comprising the step of enabling an audit or forensic analysis of a business process based on activities granted or denied within one or more control policies of the business process.

22. The method for maintaining and managing control over content of claim 1, further comprising:
displaying an indication of the control policy associated with a logical data object accessed by an authenticated user on a client computer.

23. The method for maintaining and managing control over content of claim 22, further comprising:
requesting, by a client, from a server storing control policies, a list of control policies for which the user has permissions; and
displaying the indication of a control policy of the logical data object content in a drop-down window located in a title bar of a window displaying the logical data object content, wherein the drop-down window displays the list of control policies requested from the server.

24. The method for maintaining and managing control over content of claim 23, wherein the drop-down window shows a business process hierarchy of the control policies.

25. The method for maintaining and managing control over content of claim 22, wherein the drop-down window shows the control policies to which the user can transfer the content.

26. The method for maintaining and managing control over content of claim 1, wherein one or more content use the same control policy.

27. The method for maintaining and managing control over content of claim 26, further comprising:
moving or copying at least a portion of a first content into a second content; and
conciliating control policy for at least a portion of the first content within the second content based on control policies associated with the first and the second content.

28. The method for maintaining and managing control over content of claim 1, further comprising:
modifying the control policy associated with the content without accessing the content.

29. The method for maintaining and managing control over content of claim 28, wherein modifying the control policy associated with the content further comprises similarly modifying multiple control policies.

30. The method for maintaining and managing control over content of claim 29, wherein the multiple control policies are part of one business process.

31. The method for maintaining and managing control over content of claim 1, further comprising:
recording information about the control policy associated with the content on a control policy server;
modifying the control policy associated with the content; and
reverting to an original control policy configuration based on the recorded information.

32. The method for maintaining and managing control over content of claim 1, further comprising:
applying a predetermined change to the respective control policy of the content.

33. The method for maintaining and managing control over content of claim 32, wherein the predetermined change is indicated in a business process with which the control policy is associated.

34. The method for maintaining and managing control over content of claim 1, wherein the indication of the respective control policy further includes a policy reference and an indication of a control policy server storing the respective control policy.

35. The method for maintaining and managing control over content of claim 34, wherein the indication of a control policy server is a Uniform Resource Locator (URL), and the policy reference is a numerical value known to the control policy server.

36. The method for maintaining and managing control over content of claim 1, further comprising:
distributing the content to a set of users.

37. The method for maintaining and managing control over content of claim 36, further comprising:
checking, on a content access by a user, whether the user is in the set of the users who may access the content in the manner requested, based on the respective control policy.

38. The method for maintaining and managing control over content of claim 1, further comprising:
recording the content access request and disposition in an activity log.

39. The method for maintaining and managing control over content of claim 38, further comprising:
identifying the content in the activity log based on a unique document identifier.

40. The method for maintaining and managing control over content of claim 1, wherein the content is ephemeral and is inaccessible after a designated time.

41. The method for maintaining and managing control over content of claim 1, wherein the content is permanent and is always recoverable.

42. A computer-implemented client for maintaining and managing control over content in a distributed environment, said client comprising:
a policy checker configured to check respective control policies stored in a memory for each content, the policy checker determining a policy reference of the respective control policy, wherein each control policy comprises at least an indication of a set of users who may access the content, an indication of privileges granted to each user of the set, and an indication of a set of users who may define or edit the control policy;
a communication module configured to contact a policy server with the determined policy reference;
a user interface configured to provide a user access to the content if the user is indicated in the set of users who may access the content in the manner requested based on the respective control policy corresponding to the determined policy reference; and
wherein the policy reference effectively forms an association between the respective control policy and the content, and the association being: (i) maintained independent of a computer structure encapsulating the content and separate from physical access to the computer structure encapsulating the content, and (ii) propagated to a derivative of the content.

43. A computer-implemented client of claim 42, further comprising:
   a time element that indicates to the policy checker duration of time for which access rights are valid for the content.

44. A computer-implemented server for maintaining and managing control over content in a distributed environment, said server comprising:
   a set of control policies stored in a memory, wherein each control policy comprises at least an indication of a set of users who may access the content, an indication of privileges granted to each user of the set, and an indication of a set of users who may define or edit the control policy;
   a communication module adapted to return information about a control policy in response to receiving a control policy reference; and
   wherein the policy reference effectively forms an association between a respective control policy and the content, and the association being: (i) maintained independent of a a computer structure encapsulating the content and separate from physical access to the computer structure encapsulating the content and (ii) propagated to a derivative of the content.

* * * * *

UNITED STATES PATENT AND TRADEMARK OFFICE
CERTIFICATE OF CORRECTION

PATENT NO. : 7,587,749 B2
APPLICATION NO. : 10/856112
DATED : September 8, 2009
INVENTOR(S) : Leser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Twenty-first Day of September, 2010

David J. Kappos
*Director of the United States Patent and Trademark Office*